US010123403B2

United States Patent
Trickler et al.

(10) Patent No.: US 10,123,403 B2
(45) Date of Patent: **\*Nov. 6, 2018**

(54) INTELLIGENT CONTROL OF BACKLIGHTING OR OTHER PILOT LIGHTS ON WALL SWITCH OR THE LIKE

(71) Applicant: ABL IP HOLDING LLC, Conyers, GA (US)

(72) Inventors: Christopher Trickler, Loganville, GA (US); Richard Westrick, Jr., Social Circle, GA (US); Mark Norton, Oxford, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/719,765

(22) Filed: Sep. 29, 2017

(65) Prior Publication Data

US 2018/0242426 A1    Aug. 23, 2018

Related U.S. Application Data

(63) Continuation of application No. 15/436,382, filed on Feb. 17, 2017, now Pat. No. 9,930,763.

(51) Int. Cl.
*H05B 37/02* (2006.01)

(52) U.S. Cl.
CPC ....... *H05B 37/029* (2013.01); *H05B 37/0218* (2013.01); *H05B 37/0245* (2013.01)

(58) Field of Classification Search
CPC .. H05B 37/02; H05B 37/029; H05B 37/0218; H05B 37/0245; H05B 33/08; H05B 33/0854

USPC .... 315/185 R, 112, 113, 117, 118, 130–132, 315/151–153, 291, 307, 308, 312

See application file for complete search history.

(56) References Cited

U.S. PATENT DOCUMENTS

| 9,629,220 | B2 * | 4/2017 | Panopoulos | ....... H05B 37/0209 |
| 9,930,763 | B1 * | 3/2018 | Trickier | ............... H05B 37/029 |
| 2009/0174644 | A1 | 7/2009 | Yajima et al. | |

(Continued)

OTHER PUBLICATIONS

Entire Prosecution History of U.S. Appl. No. 15/436,382, filed Feb. 17, 2017, entitled "Intelligent Control of Backlighting or Other Pilot Lights on Wall Switch or the Like."

*Primary Examiner* — Jimmy Vu

(74) *Attorney, Agent, or Firm* — RatnerPrestia

(57) ABSTRACT

A method includes retrieving a current lighting state of at least one luminaire. The lighting state includes light intensity of the at least one luminaire. The method also includes retrieving a sensor state of at least one sensor and determining a next selectable lighting state available for the at least one luminaire and an illumination adjustment for a user interface element of a lighting control device configured to control the luminaire. The determining of the next selectable lighting state available includes comparing the current lighting state and the sensor state to a set of intelligent backlighting rules, and based on the comparison, determining an indicator state corresponding to the illumination adjustment to the user interface element of the lighting control device. The illumination adjustment produces visible output to the user via the user interface element as a visible cue to guide the user to select the next lighting state.

19 Claims, 12 Drawing Sheets

(56) References Cited

U.S. PATENT DOCUMENTS

2009/0174664 A1    7/2009  Han
2013/0271004 A1   10/2013  Min et al.
2014/0354187 A1*  12/2014  Aggarwal .......... H05B 37/0245
                                                315/312

* cited by examiner

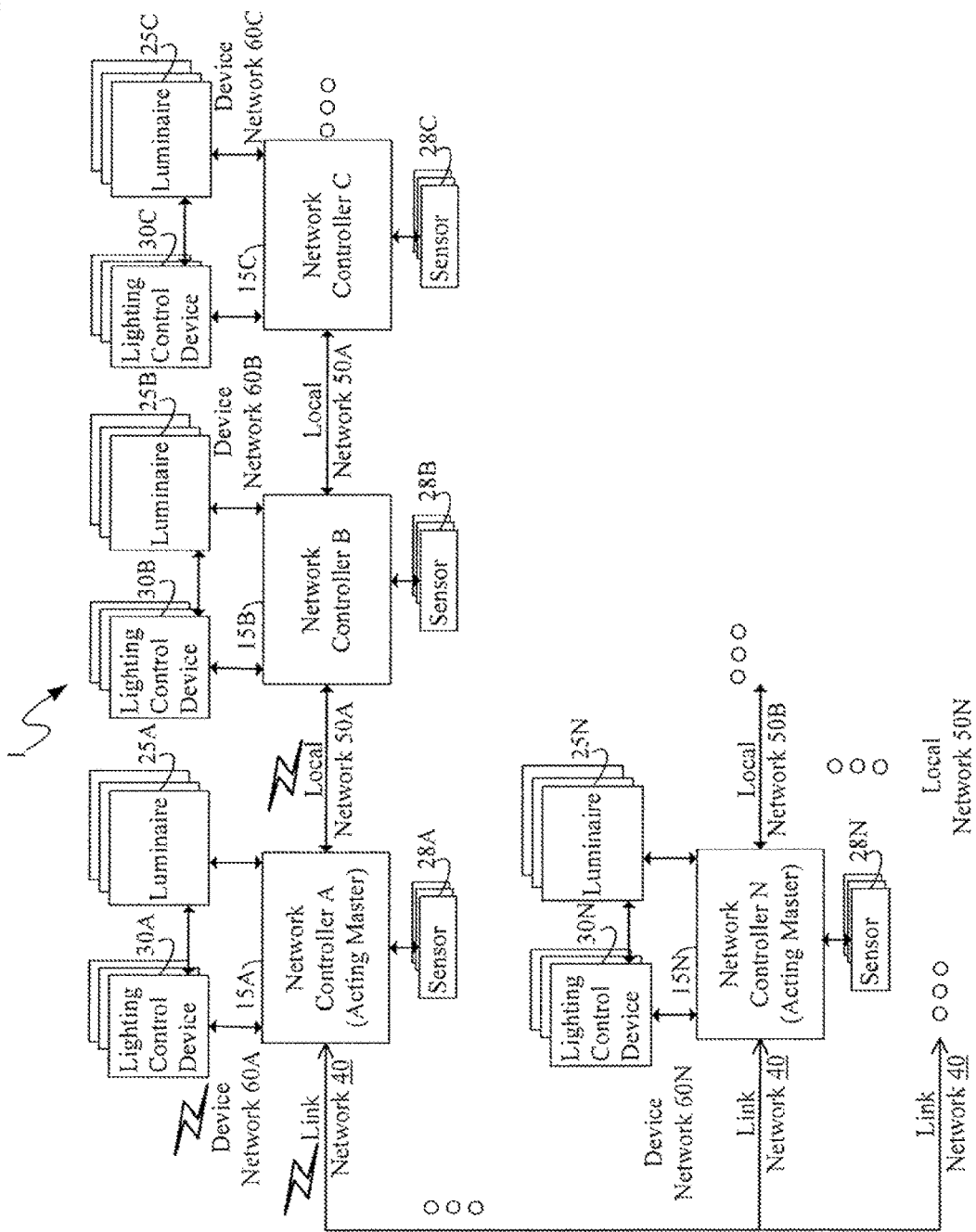

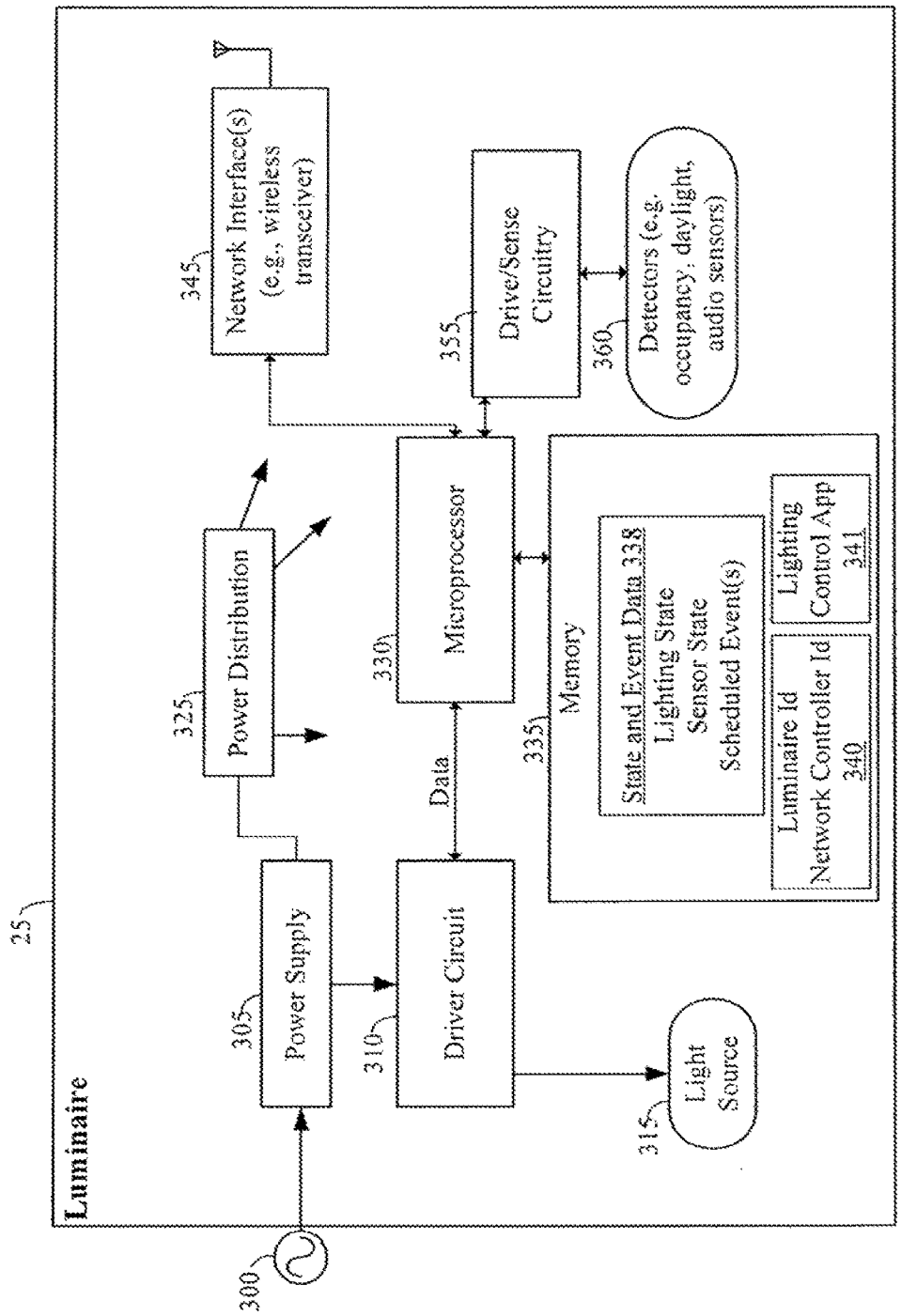

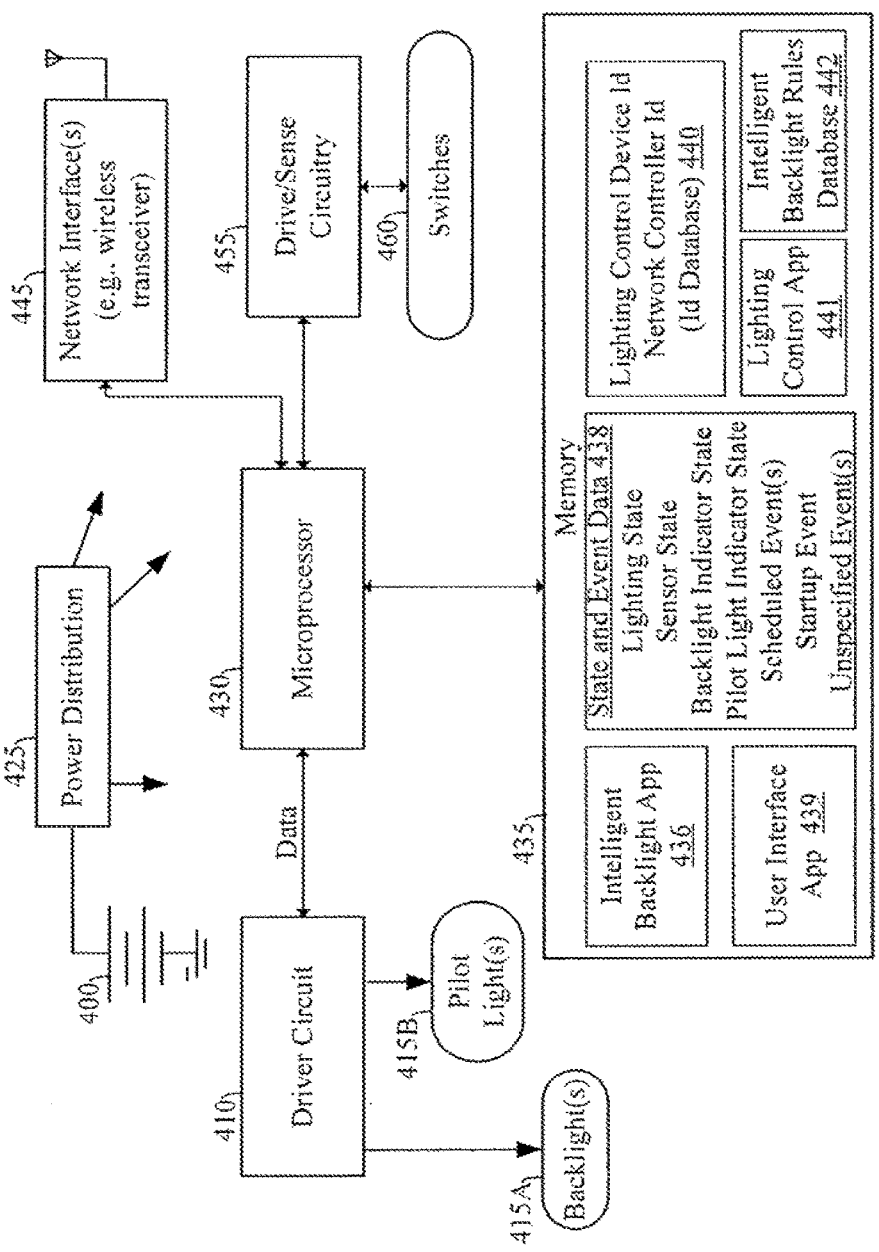

*FIG. 7A*

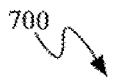

| Lighting State | Lighting State Description |
|---|---|
| Light Level Is Off | All light fixtures output is completely off. |
| Light Level Is Minimum | All light fixtures output is at 1% intensity. |
| Light Level Is Dim | All light fixtures output is below 30% intensity. |
| Light Level Is Bright | All light fixtures output is above 70% intensity. |
| Light Level Is On | All light fixtures output is 100% intensity. |

*FIG. 7B*

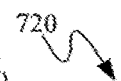

| Sensor State | Sensor State Description |
|---|---|
| Sensor Detects Near | A proximity sensor detects object within 3'. |
| Sensor Detects Far | A proximity sensor detects object within 10'. |
| Sensor Detects Far and Dim | A proximity sensor detects object within 10' and light sensor reports 30 lux. |

*FIG. 7C*

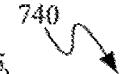

| Indicator State | Indicator State Description |
|---|---|
| Indicator Off | LED intensity at 0%. |
| Indicator Dim | LED intensity at 30%. |
| Indicator Bright | LED intensity at 70%. |
| Indicator On | LED intensity at 90%. |
| Indicator Flash Slow | LED flashes off and on at 3 Hz. |

*FIG. 7D*

| Lighting State | Sensor State | Button | Backlight Indicator State | Pilot Light Indicator State |
|---|---|---|---|---|
| Light Level Is Off | - | Button 1 | Indicator Dim | Indicator Off |
| | | Button 2 | Indicator Dim | Indicator Off |
| | | Button 3 | Indicator Dim | Indicator Off |
| | | Button 4 | Indicator Dim | Indicator Off |
| Light Level Is On | - | Button 1 | Indicator Dim | Indicator On |
| | | Button 2 | Indicator Dim | Indicator Off |
| | | Button 3 | Indicator Dim | Indicator Off |
| | | Button 4 | Indicator Dim | Indicator Off |

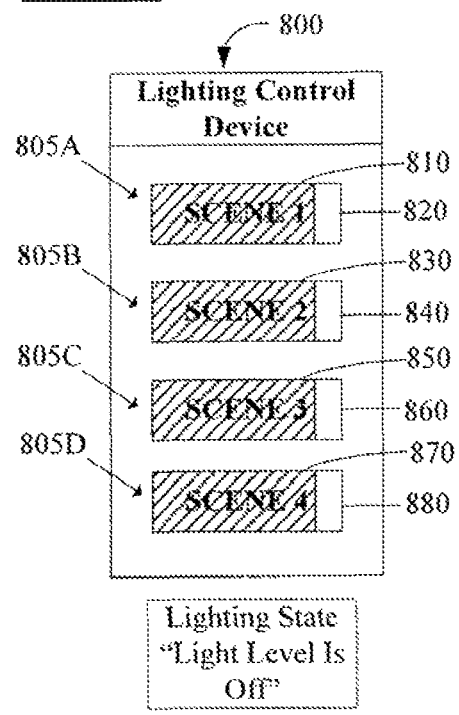
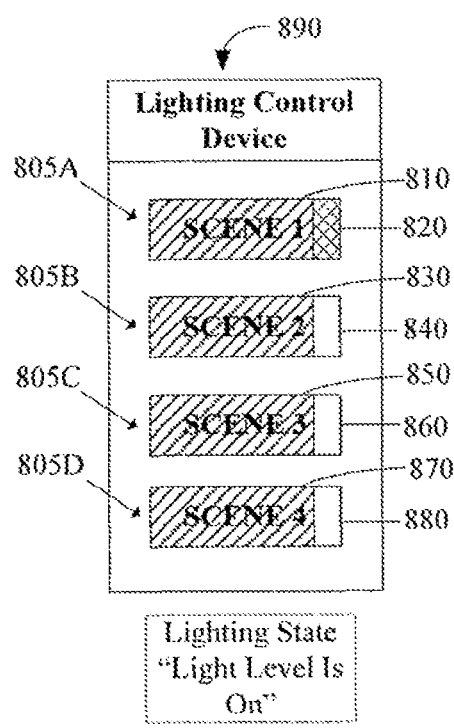

*FIG. 9*

| | Lighting State | Sensor State | Button | Backlight Indicator State | Pilot Light Indicator State |
|---|---|---|---|---|---|
| Rule 1 960 | Light Level Is Off | - | Button 1 | Indicator Dim | Indicator Off |
| | | | Button 2 | Indicator Dim | Indicator Off |
| | | | Button 3 | Indicator Off | Indicator Off |
| | | | Button 4 | Indicator Off | Indicator Off |
| Rule 2 970 | Light Level Is Dim | - | Button 1 | Indicator Dim | Indicator Dim |
| | | | Button 2 | Indicator Off | Indicator Off |
| | | | Button 3 | Indicator Dim | Indicator Off |
| | | | Button 4 | Indicator Off | Indicator Off |
| Rule 3 980 | Light Level Is Dim | Sensor Detects Far and Dim | Button 1 | Indicator Dim | Indicator Dim |
| | | Sensor Detects Far and Dim | Button 2 | Indicator Off | Indicator Off |
| | | Sensor Detects Far and Dim | Button 3 | Indicator Dim | Indicator Off |
| | | Sensor Detects Far and Dim | Button 4 | Indicator Bright | Indicator Flash Slow |

INTELLIGENT CONTROL OF BACKLIGHTING OR OTHER PILOT LIGHTS ON WALL SWITCH OR THE LIKE

CROSS-REFERENCE TO RELATED APPLICATION

This application is a continuation of U.S. patent application Ser. No. 15/436,382, filed on Feb. 17, 2017, the entire disclosure of which is incorporated herein by reference.

BACKGROUND

Some types of lighting control system button stations currently on the market use status lights as indicators of the current status of the lighting being controlled. While useful to allow the user to understand the current status of the luminaires, especially when the luminaires being controlled are remote from the location of the button station, an indicator light on the button type control station provides no guidance to the user for what is the best or most likely next action to take to control the luminaires. Thus, an inexperienced user may experience frustration or difficulty understanding what to do if they wish to control the luminaires.

Moreover, button backlights are typically used to help make the button labels readable in different lighting conditions, but the backlight amount which is required when there is a lot of ambient light is different than the backlight amount which is needed in low light conditions. Current solutions either use a compromise backlight level that is not field-adjustable, allow the user to manually set a single "compromise" backlight level which will be sub-optimal in some conditions, or use expensive and aesthetically disruptive sensors to detect and automatically adjust the backlight intensity based on the sensed ambient light level.

Improvements in indicator lights for controls of a lighting system are needed to overcome these or other limitations in the art.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 1 is a high-level functional block diagram of an example of a lighting control system of networks and devices designed to direct a user to select a next logical lighting state to artificially illuminate a room or space.

FIG. 3 is a block diagram of a luminaire that communicates via the lighting control system of FIG. 1.

FIGS. 4A-B are block diagrams of lighting control devices that communicate via the lighting control system of FIG. 1.

FIG. 5A is a networked wall switch with LEDs for backlighting textual indicators as well as LEDs or the like for pilot light type indicators, where all of the backlight LEDs are on and no pilot lights are on.

FIG. 5B illustrates the networked wall switch, in another state in which some but not all of the backlight LEDs are on and one pilot light is on.

FIG. 7A is a table of lighting states of a single luminaire or any number of luminaires that are evaluated for determining the final intelligent backlighting state of a lighting control device implementing the intelligent backlighting procedure.

FIG. 7B is a table of sensor states that are evaluated for determining the final intelligent backlighting state of a lighting control device implementing the intelligent backlighting procedure.

FIG. 7C is a table of indicator states to represent the state of a button and associated control point of a luminaire for determining the final intelligent backlighting state of a lighting control device implementing the intelligent backlighting procedure.

FIG. 7D is a table of rules used in a default configuration of intelligent backlight rules that describe a typical user interaction with a networked wall switch that does not guide the user to the next logical lighting state.

FIG. 8A illustrates the display on a networked wall switch in the "off" lighting state using the default configuration of the intelligent backlight rules of FIG. 7D.

FIG. 8B illustrates the "on" lighting state on a networked wall switch using the default configuration of the intelligent backlight rules of FIG. 7D.

FIG. 9 is a table of intelligent backlight rules for a presentation configuration, in the intelligent backlighting procedure, which are evaluated once triggered by an event and after the lighting and sensor states are retrieved.

DETAILED DESCRIPTION

Figure 2A:
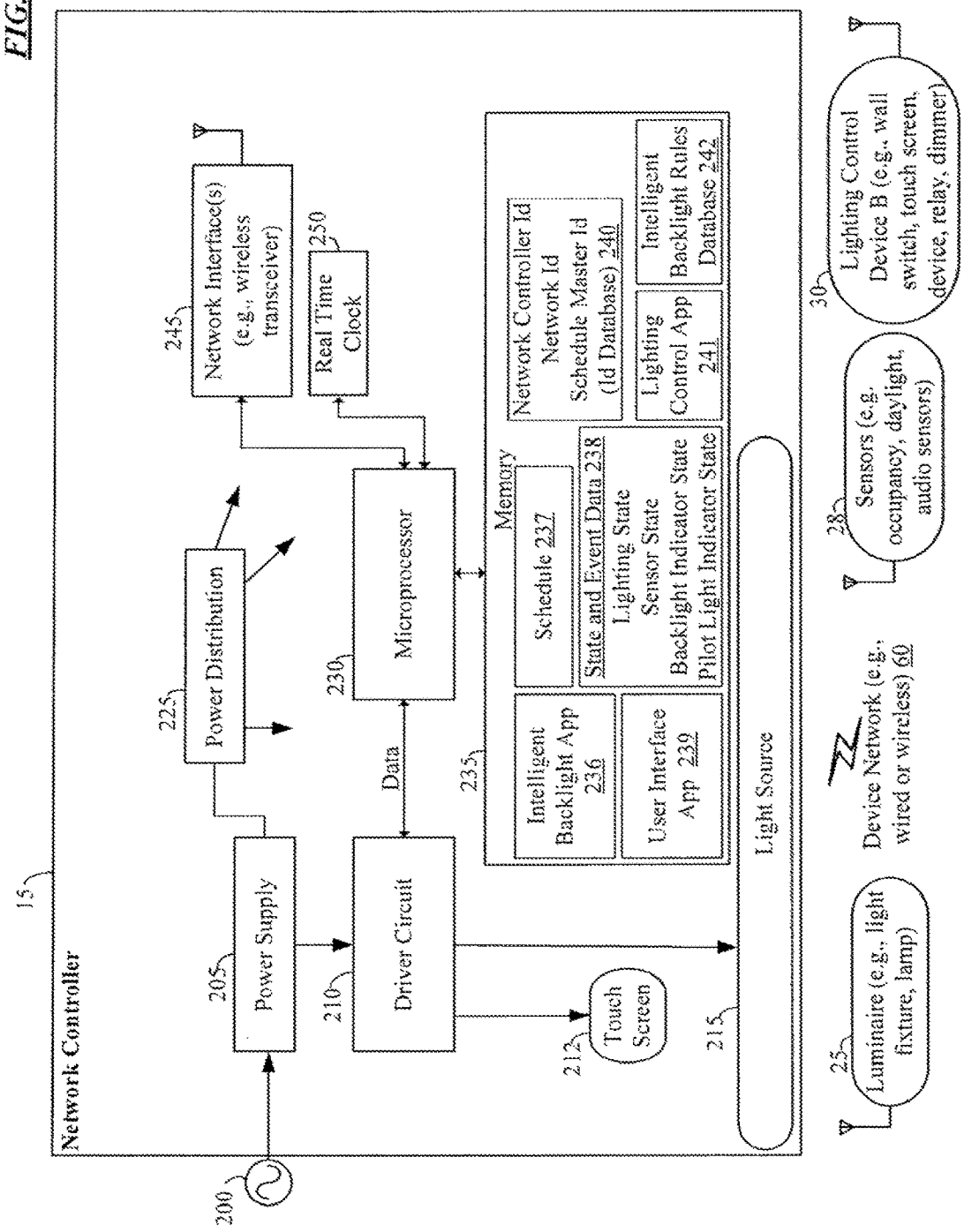
FIGS. 2A-B are block diagrams of two examples of network controllers that communicate via the lighting control system of FIG. 1.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A user of a lighting control system may only be aware of features and functionality that other similar products possess and the user has experience with. For example, a lighting control system provides functionality to turn the luminaires on in a room, turn the luminaires off, and possibly raise and lower the lighting level of the luminaires. These operations can be performed by a labeled mechanical button or graphical user-interface element among others.

A lighting control system that features intelligent backlighting defines a process by which user-interface elements, whether they be mechanical or software components, can be updated in such a way as to guide user-interaction to use particular elements or features. The user-interaction guidance or visual cue may enhance the user experience with the lighting control system by providing an indication to the next reasonable use of the lighting controls. Without such user-interaction guidance or the visual cue, a user has to rely on existing product knowledge and familiarity with related types of products in order to use the lighting control system both properly and efficiently. Accordingly, the intelligent backlighting feature is designed to aid in lighting control system product usage or in a specific user application.

Reference now is made in detail to the examples illustrated in the accompanying drawings and discussed below.

FIG. 1 illustrates a high-level functional block diagram of an example of a lighting control system of networks and devices designed to direct a user to select a next logical lighting state to artificially illuminate a room or a space.

The illustrated lighting control devices 30A-N can be a wall switch, button station, touch screen device, conventional button status light, or like user interface, that directs a user to a next logical lighting state. Sensors 28A-N can be ambient light sensors, daylight sensors, motion sensors, proximity sensors, occupancy and vacancy sensors, audio, temperature, infrared sensors, ultrasonic sensors, or other environmental sensor and the like.

Lighting control devices 30A-N can include one or more user interface elements, such as an indicator light (e.g., a backlight or a pilot light), touch screen device, display screen, etc. For example, each button on a wall switch includes a respective backlight and a pilot light. The backlight may indicate what the current lighting state of a room is (e.g., which button is active) and the pilot light indicates what the next lighting state should be. The backlight and pilot light can be of a single or multiple light intensities and/or colors to both indicate the current lighting state and/or drive the user to select the next logical lighting state. In addition, the backlight and pilot light allow the user to find lighting control devices 30A-N when the room is dark. The backlight and the pilot light can each be a light emitting diode (LED), organic light emitting diode (OLED), electroluminescent, or other appropriate light source.

When the lighting load is on, the indicator light of a respective push button associated with that particular lighting load is turned on or illuminated on the lighting control devices 30A-N. A backlight of the lighting control device 30A-N unit shines through labeling of the push buttons to provide a glowing effect.

The lighting control devices 30A-N can include dimming scenes that include a time to fade from one lighting level to another. The dimming scenes are programmable such that selecting or pressing a button associated with a particular dimming scene allows a user to select from his/her favorite light settings.

The intelligent backlighting procedure can include determining what the current state of luminaires 25A-N and the sensors 28A-N are in a room, and optimizing the background backlight on a lighting control device 30A-N or network controller 15A-N to provide the user with an indicator light to enhance the user experience by guiding the user to a next optimal lighting state. For example, when all of the luminaires 25A-N are in an off state, the light intensity of a backlight behind a button that turns all luminaires 25A-N on of a lighting control device 30A-N is adjusted (e.g., made brighter) to make all the luminaires 25A-N on button and/or its respective text label brighter and easier to find. It should be noted that the indicator of a current lighting state and a next lighting state can be represented by graphical user interface elements that are displayed on a display screen, such as on a touch screen device.

The lighting control system 1 can rely on any of network controllers 15A-N to control light intensity and/or color of the individual button backlights of lighting control devices 30A-N. For example, if luminaires 25A-N, such as light fixtures, are in an off state this can be conveyed by illuminating a backlight of an "off" button on a multi-button station to indicate the status that all of the luminaires 25A-N are off, lighting up the pilot light for the "off" state button, or illuminating the pilot light of the "off" button. While this communicates the status of the light fixtures 25A-N to the user, no information is provided to the user about the next logical lighting state.

Hence, lighting control system 1 provides multiple dimensions of information to the user to improve their ability to use the lighting control system 1 effectively and guide user behavior. To provide such guidance, network controllers 15A-N may drive the backlight of the button of lighting control devices 30A-N which activates the "luminaires on" scene button to set that "luminaires on" button to be brighter than all the other buttons and/or may illuminate the "luminaires on" scene button with a different color to guide the user to select the "luminaires on" scene button as the most appropriate choice to turn the luminaires 25A-N back on. Because the network controllers 15A-N know the light intensity of the luminaires 25A-N being controlled, the lighting control system 1 can set the relative light intensity of the button backlights of the lighting control devices 30A-N to allow the button labels to be readable in a wide variety of lighting conditions without the use of an on-board lighting sensor of a respective lighting control device 30A-N.

In an example of a completely dark room, a user interface element of lighting control device 30A is adjusted, for example an indicator light or pilot light is lit to indicate the current active effect or theme of the lighting control which may be 0% of total light intensity of the luminaires 25A-N. Accordingly, the next logical lighting state is to have all luminaires 25A-N in the room turned on. Hence, the backlight level of the 100% light intensity push button, the associated text letters, and the associated pilot light is illuminated the brightest based on an illumination adjustment. The illumination adjustment can include having the indicator light or pilot light change color, blink in a pattern, flash, or change light intensity.

When the 100% light intensity push button is selected by the user, all of the luminaires 25A-N are turned on and the pilot light has its illumination level adjusted to a dimly lit setting to indicate that luminaires 25A-N are on at the 100% total light intensity setting. From this point, the next logical lighting state is to have dimming since now the user can see in the room and so the pilot light of the 30% light intensity push button is illuminated brightly next. Of course, the environment may also be taken into account based on measurements of an ambient light sensor 28A, for example, if the user is in a presentation meeting, the backlight may be more dimly lit than if the luminaires 25A-N were completely off so as to not distract from the presentation.

A combination of the current lighting state of luminaires 25A-N (current lighting theme) and sensor state (e.g., time of day, proximity sensor detection, etc.) of sensors 28A-N can be used to drive a button state or graphical user interface element of a user interface to direct a user to select the next logical lighting state for a room in a building. An illumination adjustment is made to the button or graphical user interface, for example, if the lighting control device 30A is a wall switch with four possible buttons, then the user is guided to which button to press by applying an illumination adjustment to a particular button having a control point that corresponds to the next logical lighting state. In a completely dark room setting, the button on the lighting control device 30A that turns on all of the luminaires 25A-N has a corresponding backlight and pilot light set to a different light intensity or color compared to the current lighting state or to a flash setting to provide a visual cue that the button should be selected by the user. In a presentation or meeting setting, the button on the lighting control device 30A that turns on half of the luminaires 25A-N (50% light intensity setting) has a corresponding backlight and pilot light set to a different light intensity or color compared to the current lighting state or to a flash setting to provide a visual cue that the button should be selected. Of note, if the lighting control device 30A is a touch screen device, then a displayed LED, icon, or color graphic, or other graphical user interface element is adjusted to provide a visual cue.

Colored LED indicators may also be used in the backlight or pilot light configurations. According to the combination of lit and unlit indicators, this may draw the attention of a user to the respective areas of the lighting control device user interface. The configuration or actuation of the LED indicator states or graphical user interface element of a display screen is driven by intelligent backlighting rules, as explained in further detail below. The intelligent backlighting rules are evaluated once triggered by an event and after the lighting and sensor state are retrieved. By comparing the lighting state and sensor state for each user interface element (e.g., a button), a resultant state of the user interface elements can be determined (e.g., a backlight indicator or pilot light indicator). The rules are a data set or database that may or may not be relational or hierarchal in format. The quantity and types of sensory data and lighting states create interesting interactions between the user, their environment, and an intelligent backlighting capable device.

Network controllers 15A-N are nodes that act on lighting state change events, sensor state change events, startup events, or other unspecified events and control end devices within the lighting control system 1. A lighting state change event occurs when the lighting state changes from the current evaluated state to a next/new evaluated lighting state. Typically, this occurs when a user is adjusting the light level in the room from a network controller 15A-N, lighting control device 30A-N (e.g., wall switch), or similar device. A sensor state change event occurs when the sensor state of a sensor 28A-N changes from its current evaluated state to a new evaluated state. Typically, this occurs with a user approaching a device which makes use of a proximity sensor, or the ambient light level changes due to a light fixture output adjustment, or a change is detected in the light level through a photocell, or any number of other sensory devices used within the lighting control system 1.

Each network controller 15A-N has a unique identifier and hardware/software elements, such as a microprocessor, real time clock, user interface, storage, and networking components. Network controllers 15A-N can be a touch screen device (e.g., commercially available from Acuity Brands Lighting under the trade name Fresco®), a mobile device, such as a tablet computer or smartphone, a lighting management panel or module (e.g., under the trade name Fresco®), low voltage wall station (e.g., commercially available from Acuity Brands Lighting under the trade name nLight®), network wall switch sensors (e.g., under the trade name nLight®), or intelligent luminaire with on-board controls and sensors.

Lighting control devices 30A-N are intelligent backlight components, including a simple user interface such as a wall switches (e.g., mechanical push buttons). Each lighting control device 30A-N has hardware/software elements such as a microprocessor, user interface, storage, and networking components. Lighting control devices 30A-N can be equipped with backlights that have variable control over the indicator lights, such as backlights providing illumination for a button, button label, or pilot lights mounted next to a button to indicate the button status. Lighting control devices 30A-N may be dumb wall switches that that only turn luminaires 25A-N on/off and do not remember lighting state. If lighting control devices 30A-N are dumb wall switches, then messages are sent to network controllers 15A-N to receive an illumination adjustment to drive the backlight or pilot light to in order to make a recommendation of the next logical light state to the user.

As shown, luminaires 25A-N, sensors 28A-N, and lighting control devices 30A-N are connected to respective network controllers 15A, 15N via a local network 50A-N although the connection passes through a respective device network 60A-N. Network controllers 15A-N can act on intelligent backlight rules to control user interface elements of lighting control devices 30A-N to guide a user to select a next logical light state for luminaires 25A-N. Initiating events for the intelligent backlight protocol can be a schedule of schedule events which are timed-based lighting control events. A schedule event is an event time that is a time setting (08:00 AM), an event date that is a date setting (Dec. 15, 2016), a zone identifier setting (zone 1), and a light intensity adjustment (100%). Upon occurrence or generation of such a timed-based lighting control event in the schedule, the network controllers 15A-N communicate the schedule event information to other devices (luminaires 25A-N and lighting control devices 30A-N). The intelligent backlighting rules may then be evaluated based on the current lighting state and sensor state. Based on the evaluation of the rules, illumination adjustments are determined and transmitted to lighting control devices 30A-N that display the illumination adjustments to provide a visual cue to the user to select the next logical lighting state. Of note, such illumination adjustments may be determined by the lighting control devices 30A-N and luminaires 25A-N instead of network controllers 15A-N.

The luminaires 25A-N, sensors 28A-N, and lighting control devices 30A-N do not have to be directly connected to a respective network controller 15A-N (which can serve as a control panel). For example, because luminaires 25A-N are controlled by respective lighting control device 30A-N, some or all communication destined to or from respective network controllers 15A-N related to lighting control events is via respective lighting control devices 30A-N. Hence, luminaires 25A-N and sensors 28A-N can be indirectly connected to respective network controllers 15A-N through respective lighting control devices 30A-N, for example, in order to receive lighting-based controls. In other words, luminaires 25A-N and sensors 28A-N can be driven or controlled by lighting control devices 30A-N via device networks 60A-N. Of note, several network controllers 15A-N or lighting control devices 30A-N can control a single luminaire 25A-N. Moreover, luminaires 25A-N and sensors 28A-N may be in direct communication with each other via devices networks 60A-N.

The network topology of lighting control system 1 includes a collection of system components comprised of network controllers 15A-N, luminaires 25A-N (e.g., light fixtures, table lamps, floor lamps, or night lights), sensors 28A-N, and lighting control devices 30A-N. The light fixture is, for example, a recessed cove fixture, under-cabinet lighting, direct/indirect pendant lighting, a recessed can, wall wash lighting, a wall sconce, task lighting, a recessed fluorescent light, a chandelier, a ceiling fan light, an outdoor yard light, etc. The system components are connected by a specific combination of hierarchal wired, wireless, and virtual connections. The illustrated networks 40, 50A-N, and 60A-N can be via nLight® (commercially available from Acuity Brands Lighting), digital multiplex (DMX) control, RS-485, CAN, Fresco® control network (FCN) (commercially available from Acuity Brands Lighting), Ethernet, a local area network, (LAN, e.g., Intranet), a wide area network (WAN, e.g., Internet), wireless mesh network (e.g., ZigBee), and a personal area network (e.g., Bluetooth or Z-Wave). FCN, DMX control, nLight®, and Z-Wave are lighting-centric networks that control a variety of luminaires, and therefore are utilized for local networks 50A-N and device networks 60A-N, in the example. The link network 40 may be a LAN, such as Intranet, or Internet, in our example. Accordingly, link network 40, local networks 50A-N, and device networks 60A-N may utilize different communication protocols, for example, the lighting control system 1 is a hierarchical network. The link network 40, local networks 50A-N, and device networks 60A-N are separate networks but with a shared application protocol for intelligent backlighting controls. It should be appreciated, however, that link network 40, local networks 50A-N, and device networks 60A-N may be a different part of the same network tree or star network, and therefore are not separate networks and can utilize the same network communication protocols.

Multiple network controllers 15A-N may be connected by a separate network defined as a link network 40. Certain network controllers 15A-N are designated as acting master network controllers 15A, 15N. The network controllers 15A-N that are currently acting as master network controllers 15A, 15N are connected by link network 40 to allow for the passing/transmission of intelligent backlighting controls that span link network 40. The separation of networks 40, 50A-N, 60A-N in this hierarchal method allows for isolation of network communication, events, and errors to a particular network.

Subsets of network controllers 15A-N are connected by a particular local network 50A-N to allow for transmission of intelligent backlighting controls that span a particular local network 50A-N. As shown, network controllers 15A-C are in communication via local network 50A. Network controller 15B connects to a respective luminaire 25B via a wireless device network 60B, such as a lighting-centric wireless communication network, that is totally separate from local network 50A and link network 40. Also, local network 50A and link network 40 are each separate wired or wireless communication networks.

Designation of which of network controllers 15A-N act as a master network controller on a particular local network 50A-N changes. For example, upon failure of master network controller 15A, network controller 15B is designated as master network controller of local network 50A and connects to link network 40 for the passing of events (intelligent backlighting controls).

Luminaires 25A-N and lighting control devices 30A-N are connected to a particular network controller 15A-N by a device network 60A-N to allow for transmission of both local events (local intelligent backlighting controls) specific to a respective local network 50A-N or global events (global intelligent backlighting controls) for the entire link network 40. As shown, luminaire 25A and lighting control device 30A are in communication with master controller 15A via device network 60A. Further, luminaire 25N and lighting control device 30N are in communication with network controller 15N via device network 60D. Through a respective network controller 15A-N, luminaires 25A-N and lighting control devices 30A-N are networked with other devices on a respective device network 60A-N.

A variety of lighting controls are transmitted over networks 40, 50A-N, and 60A-N, including, illumination adjustments to provide a visual cue to the user to select the next logical lighting state, controls to turn luminaires on/off, adjust dimming level (dim up/down), set scene (e.g., a predetermined light setting), and sensor trip events. The lighting controls are transmitted in the form of an event. Each network controller 15A-N, luminaire 25A-N, and lighting control device 30A-N, can be equipped with wireless transceiver(s), such as a near range Bluetooth Low Energy (BLE) radio. To allow for wireless communication over all three types of networks 40, 50A-N, and 60A-N, each of the network controllers 15A-N, luminaires 25A-N, and lighting control devices 30A-N may include separate radios that operate at three different frequencies, such as sub-GHz (e.g., 900 MHz), Bluetooth Low Energy (BLE 2.4 GHz), and 5 GHz, for example.

Luminaires 25A-N can be dimmable, such as a dimmable light fixture, and comprise light emitting diodes (LEDs) that emit red, green, and blue (RGB) light or tunable white light. Luminaires 25A-N are coupled to respective lighting control devices 30A-N to receive events (lighting control events) and related messages via a respective network controller 15A-N. Daylight, occupancy, and audio sensors or switches can be embedded in lighting control devices 30A-N, luminaires 25A-N, or even network controllers 15A-N to enable events to be generated and transmitted via network controllers 15A-N based on occupancy and dimming adjustments, for example.

Figure 2B:
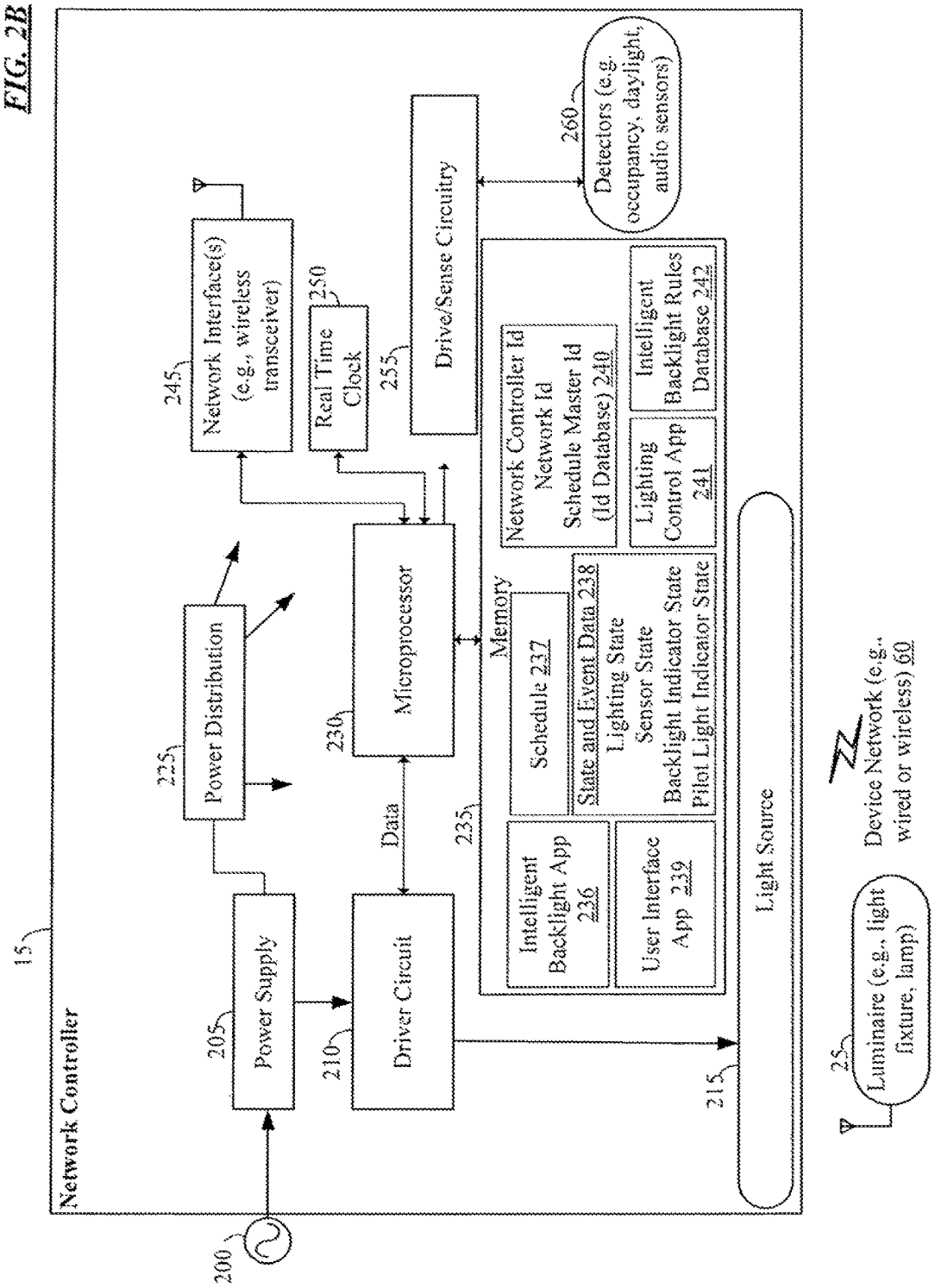

FIGS. 2A-B are block diagrams of a network controller 15 that communicates via the lighting control system of FIG. 1. Two different architectures are shown for the network controller 15 in FIGS. 2A-B. As shown in FIG. 2A, the network controller 15 is in communication with a luminaire 25 (e.g., a light fixture or lamp), sensor 28 (e.g. occupancy, daylight, or audio sensors), and lighting control device 30 (e.g., wall switch, relay, or dimmer). In FIG. 2B, drive/sense circuitry 255 and detectors 260 are on-board the network controller 15. Detectors 260 can be infrared sensors for occupancy or motion detection, an in-fixture daylight sensor, an audio sensor, a temperature sensor, or other environmental sensor. Drive/sense circuitry 255, such as application firmware, drives the occupancy, audio, and photo sensor hardware. It should be understood that network controller 15 may not necessarily include driver circuit 210, light source 215, or drive/sense circuitry 255 as part of the network controller 15 structure because control of a luminaire does not have to reside within the network controller 15 itself.

Network controller 15 can be an integrated luminaire (or a standalone touchscreen device) that includes a power supply 205 driven by a power source 200. Power supply 205 receives power from the power source 200, such as an AC mains, battery, solar panel, or any other AC or DC source. Power supply 205 may include a magnetic transformer, electronic transformer, switching converter, rectifier, or any other similar type of circuit to convert an input power signal into a power signal suitable for light source 215. Light source 215 can include light emitting diodes (LEDs) that emit red, green, and blue (RGB) light or tunable white light.

Network controller 15 further includes, a driver circuit 210, for example, an intelligent LED driver circuit. Driver circuit 210 is coupled to light source 215 and drives that light source 215 by regulating the power to light source 215 by providing a constant quantity or power to light source 215 as its electrical properties change with temperature, for example. The driver circuit 210 provides power to light source 215. Driver circuit 210 may be a constant-voltage driver, constant-current driver, or AC LED driver type circuit that provides dimming through a pulse width modulation circuit and may have many channels for separate control of different LEDs or LED arrays that comprise light source 215. An example of a commercially available intelligent LED driver circuit 210 is manufactured by EldoLED.

Driver circuit 210 can further include an AC or DC current source or voltage source, a regulator, an amplifier (such as a linear amplifier or switching amplifier), a buck, boost, or buck/boost converter, or any other similar type of circuit or component. Driver circuit 210 outputs a variable voltage or current to the light source 215 that may include a DC offset, such that its average value is nonzero, and/or an AC voltage.

For purposes of communication and control, network controller 10 is treated as a single or a multi-addressable device that can be configured to operate as a member of a link network 40, a respective local network 50A-N, and a respective device network 60A-N. If the network controller 15 is a luminaire, then network controller 15 is line powered and remains operational as long as power is available. Alternatively, if network controller 15 is a touch screen type device as described in FIG. 4B, network controller 15 may be battery powered.

Network controller 15 includes power distribution circuitry 225, a microprocessor 230, a memory 235, and a real time clock 250. As shown, microprocessor 230 is coupled to driver circuit 210 and the microprocessor 230 includes a central processing unit (CPU) that controls the light source operation of the light source 215. Memory 235 can include volatile and non-volatile storage. The real time clock 250 in conjunction with a real time operating system (RTOS) programming stored in the memory 235 (not shown) support multiple concurrent processing threads for different simultaneous control or intelligent backlighting communication operations of the network controller 15.

The power distribution circuitry 225 distributes power and ground voltages to the microprocessor 230, memory 235, network interface(s) 245 (e.g., wireless transceivers), real time clock 250, drive/sense circuitry 255, and detector(s) 260 to provide reliable operation of the various circuitry on the network controller 15.

Network interface(s) 245 allows for data communication (e.g., wired or wireless) over all three types of networks 40, 50A-N, and 60A-N. For example, network controller 15 includes a tri-band wireless radio communication interface system configured for wireless communication via separate radios that operate at three different frequencies, such as sub-GHz (e.g., 900 MHz), BLE (2.4 GHz), and 5 GHz, for example. A first transceiver of such a network communication interface system is for communication, over a lighting device network, with a sensor, a lighting control device, and a luminaire (e.g., a dimmable light fixture) to adjust lighting intensity of the luminaire based on the local lighting event messages and the global lighting event messages.

Illumination adjustments for a lighting control device to guide a user to select a next lighting state by a visual cue and transition away from a current lighting state are also transmitted over the lighting device network by network controller 15 via the first transceiver. A second transceiver is for communication of the illumination adjustments and local lighting event messages, over a first local network, with a first plurality of network controllers in communication over the first local network that includes a first network controller. A third transceiver is for communication of the illumination adjustments and global lighting event messages, over a link network, of at least two different schedule master controllers, the two different schedule master controllers connected to a separate LAN of respective network controllers.

Microprocessor 230 serves to perform various operations, for example, in accordance with instructions or programming executable by microprocessor 230. For example, such operations may include operations related to communications with luminaire 25, sensor 28, and other network controllers during the intelligent backlighting procedure. Although a processor may be configured by use of hardwired logic, typical processors are general processing circuits configured by execution of programming. Microprocessor 230 includes elements structured and arranged to perform one or more processing functions, typically various data processing functions. Although discrete logic components could be used, the examples utilize components forming a programmable CPU. A microprocessor 230 for example includes one or more integrated circuit (IC) chips incorporating the electronic elements to perform the functions of the CPU. The microprocessor 230, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in network controller 15, luminaires 25A-N, sensors 28A-N, and lighting control devices 30A-N, network elements, etc.

Memory or storage system 235 is for storing data and programming. In the example, the memory system 235 may include a flash memory (non-volatile or persistent storage) and a random access memory (RAM) (volatile storage). The RAM serves as short term storage for instructions and data being handled by the microprocessor 230, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions or programming may be used to implement any other device functions associated with communications during the intelligent backlighting procedure of network controller 15. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 235, or a memory of a computer used to download or otherwise install such programming into the network controller 15, or a transportable storage device or a communications medium for carrying program for installation in the network controller 15.

As shown, the network controller 15 includes programming in the memory 235 which configures the microprocessor 230 to control operations of the light source 215, including the communications over the network interface(s) 245 via the tri-band wireless radio communication interface system. The programming in the memory 235 includes an intelligent backlight application 236, a user interface application 239, and lighting control application 241. The memory also stores an identifier database 240 that includes a network controller identifier, local network identifier, and schedule master identifier. Network controller identifier is a unique numeric (or alphanumeric) identifier of the network controller 15 and, in some cases, signifies the priority of one network controller over another regarding how messages are handled (e.g., designation of which is the acting master controller). Network controller identifier is unique per local network and the network identifier and the network controller identifier represent the overall uniqueness of the network controller 15. Network identifier is a unique numeric (or alphanumeric) identifier of the local network that the network controller 15 exists on. The network identifier may also represent a logical collection of network controllers on different and separate local networks, for example, network identifier can be a zone identifier. The various stored identifiers in the identifier database 240 are used during the transmission of messages over networks 40, 50A-N, and 60A-N to identify senders and intended recipients of the messages to applying lighting controls and illumination adjustments to guide a user to select a next lighting state by a visual cue and transition away from a current lighting state.

The memory 235 further comprises state and event data 238. State and event data 238 stores lighting state (e.g., light intensity or output) of various luminaires 25. A lighting state is a general state or evaluation of the light output or intensity of a single or number of luminaires. The lighting state can be used to aggregate the state of multiple light fixtures and their intensities (including color, or color temperature, among other parameters of fixture). The lighting state is also commonly referred to as a scene or preset within the lighting controls industry. State of the sensor 28 is stored as state and event data 238. The sensor state is a general state or evaluation of one or more types of sensors located within a network controller 15, a lighting control device 30 (e.g., another networked device, such as wall switch), or any sensor equipped device. The sensor state can represent a proximity sensor and its detection of an object (usually a person) within some distance from the sensor. The sensor state can represent ambient light level (lux) measured in a room the sensor is directed at. There are no fixed number or types of sensors that can be used in the intelligent backlighting process.

State and event data 238 also includes an indicator state which is the state of an LED whether it for backlighting a button (backlight indicator state) and its label or a pilot light (pilot light indicator state) mounted next to a button and therefore associated with the button. An indicator state could also be a graphical representation of an LED, icon, or color graphic. The indicator state is typically used to represent the state of a button and its associated control point such as a light fixture. Normally, if the control point state changes, the indicator state of a button also changes to reflect current state.

User interface application 239 receives user input of a local lighting control event, for example, via a touch screen 212 of network controller 15. The local lighting control event is to adjust a local group of luminaires controlled by a first plurality of network controllers (including first network controller 15) on a first local network to a current lighting state specified by a first light intensity level (e.g., 30%). Alternatively, the input may also include a global lighting control event to adjust a global group of luminaires controlled by at least two different schedule master controllers to the current lighting state. These local and global lighting control events are stored as the state and event data 238 in the memory 235.

Lighting control application 241 generates the local event messages based on the touch screen received user input via the user interface application 239 to adjust the local group of luminaires controlled by the network controllers of the first local network. The local lighting event message includes the first light intensity level. Lighting control application 241 sends the local lighting event message to the first plurality of network controllers on the first local network.

Figure 4B:
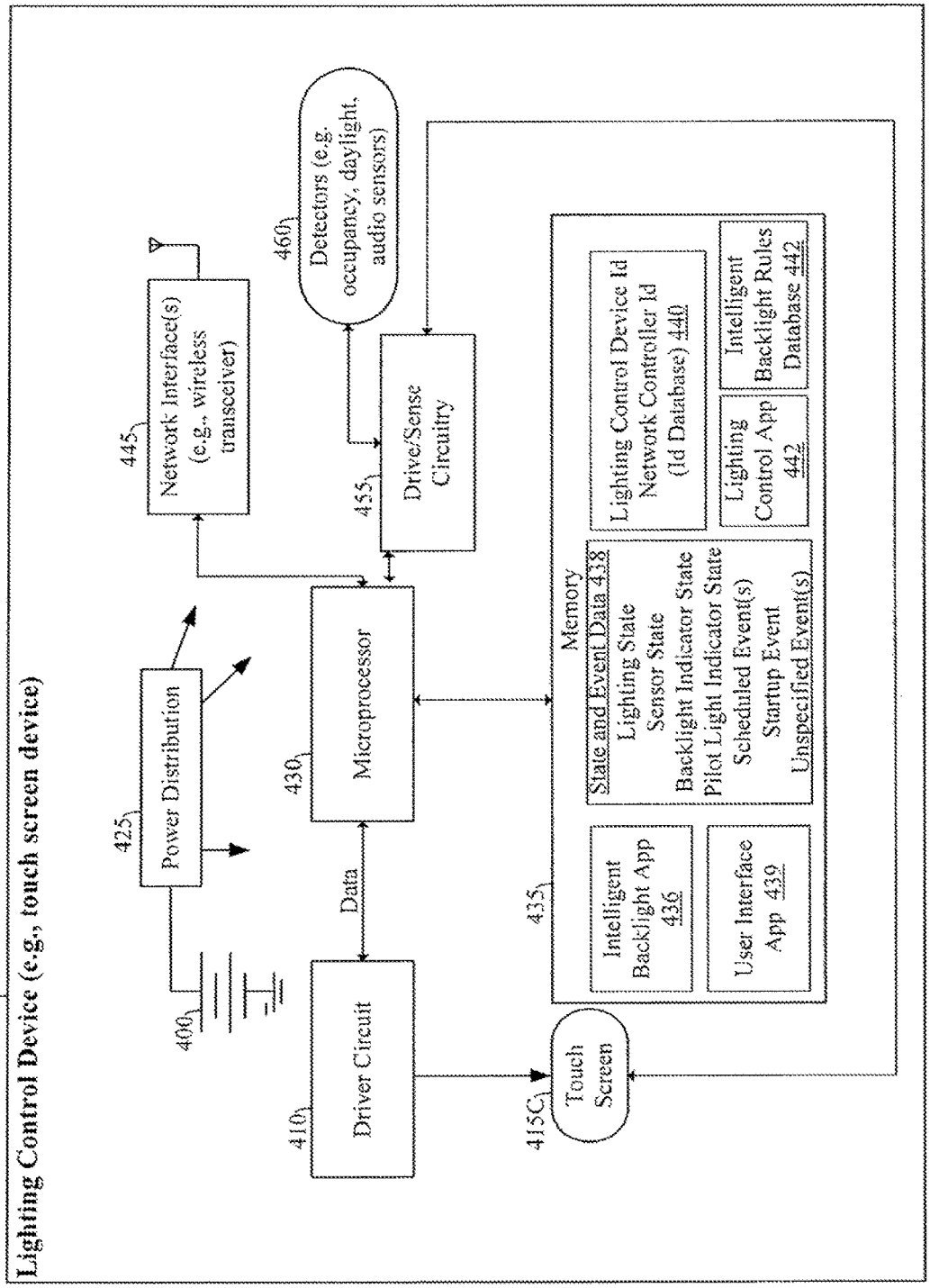

Lighting control application 241 also generates a global lighting event message based on the touch screen received user input (see description of touch screen and drive/sense circuitry in FIG. 4B) via the user interface application 239 to adjust a global group of dimmable luminaires 25 controlled by the at least two different master controllers. The global lighting event message includes the second light intensity level. The lighting control application 241 sends the global lighting event message to the at least two different master network controllers on the link network.

In addition to input by user interface application 239, local or global event messages are also generated by lighting control application 241 in response to other events, such as a startup event, a lighting state change event, a sensor state change event, a scheduled event, or an unspecified event. Local and global lighting control events that are set to occur in the future include an event dates and an event time for the lighting state change to occur are stored as schedule events and may be stored as the schedule 237 in the memory 235. The triggering of an event causes the intelligent backlight procedure of the intelligent backlight application 236 to be executed. For example, after lighting control application 241 adjusts the group of luminaires to the current lighting state specified by the first light intensity level (e.g., 30%) based on the generated local or global lighting control event, the intelligent backlight application 236 retrieves the current lighting state of at least one luminaire 25 from the group of luminaires and retrieves a sensor state of sensor 28 from state and event data 238.

Intelligent backlight application 236 determines a next selectable lighting state available for the luminaire 25 and an illumination adjustment for the network controller itself 15 (or lighting control device 30) to guide a user to select the next lighting state and transition away from the current lighting state by comparing the current lighting state and the sensor state to a set of intelligent backlight rules 242. Based on the comparison, intelligent backlight application 236 determines an indicator state corresponding to the illumination adjustment for a user interface element (e.g., touch screen 212) of network controller 15 (or lighting control device 30) having a control point to change the luminaire 25 to the next lighting state in response to input from a user. The illumination adjustment guides the user to select the next lighting state by a visual cue.

In an example, where the user interface element is a button and a pilot light on a wall switch, intelligent backlight application 236 determines the indicator state by determining: (i) a backlight indicator state representing a backlight of the button having the control point and corresponding to a first illumination adjustment, and (ii) a pilot light indicator state representing state of the pilot light that is next to the button and corresponding to a second illumination adjustment.

Execution of intelligent backlight application 236, user interface application 239, and lighting control application 241 by the microprocessor 230 configures network controller 15 to perform the respective functions outlined above.

FIG. 3 is a block diagram of a luminaire 25 that communicates via the lighting control system of FIG. 1. The circuitry, hardware, and software of luminaire 25 shown is similar to the network controller of FIGS. 2A-B. However, as shown, luminaire 25 can include a subset of the circuitry, hardware, and software shown for the network controller 15 of FIG. 2B.

Luminaire 25 may be a singularly addressable device designated by a luminaire identifier and is configured to operate as a member of a respective device network 60 as shown in FIG. 1, or a zone. Hence, the network interface(s) 345 of luminaire 25 may comprise a single radio for communication over device network 60, as opposed to the tri-band network communication interface of network controller 15 for communication over the three different types of networks 40, 50, 60.

The memory 335 further comprises state and event data 338. The state and event data 238 stores lighting state (e.g., light intensity or output) of luminaire 25. The state and event data 338 also includes the state of the detectors (e.g., occupancy, daylight, and audio sensors) as well as schedule event(s).

Luminaire 25 is represented by a unique device identifier, such as a serial number, media access control (MAC) address, etc. In our example, the identifier database 340 in memory stores 335 stores a luminaire identifier that can be an alphanumeric identifier that uniquely identifies luminaire 25 on a given device network and a network controller identifier that uniquely identifies the network controller that controls the luminaire, such as by managing a schedule. Upon receipt of a lighting control event message from the network controller at a luminaire 25, the luminaire 25 checks a source identifier in the schedule event action message to determine whether the source identifier matches the stored network controller identifier in the identifier database 340 in memory 335. The luminaire 25 also checks a destination identifier in the lighting control event message to determine whether the destination identifier matches the stored luminaire identifier in the identifier database 340 in memory 335.

The lighting control event message is discarded if the source identifier and the destination identifier checks are not determined to match. The lighting control event message is also discarded if it is a duplicate. If the source identifier and the destination identifier checks match, then the lighting control event message payload is extracted from the message and processed by the lighting control application 341 running on the processor 330 so that luminaire 25 acts in accordance with the lighting control event by adjusting (e.g., turns on/off or dims) light source 315. For example, the state and event data 338 of the luminaire 25 is updated in accordance with the lighting control event message. The lighting control event can then be acknowledged.

Although the block diagram for the luminaire 25 illustrates a variety of components, such as state and event data 338 and network interface(s) 345, it should be understood that the luminaire 25 may be a dumb device (e.g., with a microprocessor and sensor) for controlling LEDs, relays, or lighting fixtures themselves.

FIGS. 4A-B are block diagrams of lighting control devices 30 that communicate via the lighting control system of FIG. 1. The circuitry, hardware, and software of lighting control device 30 shown are similar to those of the network controller 15 of FIG. 2B and luminaire 25 of FIG. 3. However, lighting control device 30 is a device that drives outputs of a user interface element, such as backlight 415A and pilot light 415B based on the illumination adjustment of the indicator state to guide the user to select the next lighting state by a visual cue. Lighting control device 30 also processes lighting control inputs in order to control a luminaire 25, but typically does not itself include a light source for purposes of artificial illumination of a space intended for occupancy by a living organism (i.e., space lighting).

The network communication interface 445 of lighting control device 25 may include a first transceiver to communicate with a network controller to receive an illumination adjustment for a user interface element of a lighting control device configured to control the luminaire. The illumination adjustment is to produce visible output to the user via the user interface element as a cue to guide the user to select the next lighting state and instruct the user to transition the luminaire away from the current lighting state. A second transceiver may communicate over a lighting device network, with the at least one luminaire to adjust light intensity of the at least one luminaire 25.

Lighting control device 30 may be a singularly addressable device designated by a lighting control device identifier and is configured to operate as a member of a respective device network 60 as shown in FIG. 1, or a zone. Hence, the network interface(s) 445 of lighting control device 30 may comprise a single radio for communication over device network, as opposed to the tri-band network communication interface of network controller 15 used to communicate over the three different types of networks 40, 50, 60.

Lighting control device 30 is represented by a unique device identifier and the memory stores 435 stores an identifier database 440 that has a lighting control device identifier, such as an alphanumeric identifier, that uniquely identifies lighting control device 30 on a given device network. The identifier database 440 in the memory 435 also stores a network controller identifier that uniquely identifies the network controller 15 that manages the lighting control device 30.

In the example of FIG. 4A, the lighting control device 30 is a wall switch where the drive/sense circuitry 455 responds to actuation and/or states of one or more switches 460. The switches 460 include or are coupled to respond to buttons operated by the user. Switches 460 can include one or more of an on/off switch, dimmer switch, or set scene switch, for example, based on Acuity Brands Lighting's commercially available xPoint® Wireless ES7 product. In our example, lighting control device 30 includes a single shared button switch 460 for on/off, dimming, or set scene functions and the LED backlight 415A of lighting control device 30 communicates the current load state and a pilot light 415B communicates the next recommended load state. Although not separately shown, the single shared button includes a user output, e.g. to indicate one or more states for current illumination and/or next lighting selection, which is backlit by the backlight 415A. The lighting control application 441 generates local lighting control event messages based on lighting control adjustments from the switch 460 in response to user operation of the single shared button.

The programming in the memory 435 includes an intelligent backlight application 436, state and event data 438, a user interface application 439, a lighting control application 441, and intelligent backlight rules database 442, as described with reference to network controller in FIGS. 2A-B. The memory also stores an identifier database 240 that includes a lighting control device identifier and a network controller identifier.

Different event types are shown for the lighting control device 30 in FIGS. 4A-B, for example, scheduled event(s), a startup event, and unspecified event. A startup event occurs when the device implementing the core of the intelligent backlighting process (e.g., the device that actually determines the indicator state as opposing to receiving the indicator state), such as lighting control device 30 or network controller 15, starts running the intelligent backlight application 436. This startup event causes the device to evaluate the intelligent backlight rules 442 for the first time and place the user interface element in a known state. A scheduled event occurs according to a specified time and date and usually originates from a network controller 15 or other device which has a real-time clock and time clock based applications. The scheduled event is identical to other events in regards to its purpose within this system. An unspecified event is a general placeholder for any other type of event and is not restricted to a particular input. The events cause the lighting control device 30 to evaluate the intelligent backlight rules 442 and recommend a next lighting state.

In an example, intelligent backlight application 436 retrieves a current lighting state of at least one luminaire 25 and a sensor state of at least one sensor 28. The intelligent backlight application 436 determines a next selectable lighting state available for the at least one luminaire 25 and an illumination adjustment for a user interface element of a lighting control device 30 by comparing the current lighting state and the sensor state to a set of intelligent backlighting rules 442. Based on the comparison, intelligent backlight application 436 determines an indicator state corresponding to the illumination adjustment for a user interface element of the lighting control device having a control point to change the at least one luminaire 25 to the next lighting state in response to input from a user. The illumination adjustment is to produce visible output to the user via the user interface element as a cue to guide the user to select the next lighting state and instruct the user to transition the luminaire away from the current lighting state.

If the user interface element is a button with a backlight 415A and a pilot light 415B next to the button on a wall switch, the intelligent backlight application 436 determines: (i) a backlight indicator state representing a backlight 415A of the button having the control point and corresponding to a first illumination adjustment, and (ii) a pilot light indicator state representing state of the pilot light 415B that is next to the button and corresponding to a second illumination adjustment. The intelligent backlight application 436 may then cause driver circuit 410 to drive the backlight 415A and the pilot light 415B of the lighting control device 30 based on the determined backlight indicator state and the determined pilot light indicator state. The first illumination adjustment of the backlight 415A and the second illumination adjustment of the pilot light 415B transitions the backlight 415A and the pilot light 415B to a different light intensity or color compared to the current lighting state or to a flash setting.

Although the block diagrams for lighting control device 30 in FIGS. 4A-B illustrate a variety of components, such as state and event data 438 and user interface application 439, it should be understood that, in an example, the lighting control device 30 may not have the state and event data 438 because lighting control device 30 is controlled by network controllers 15A-N. Otherwise, the lighting control device 30 would need to necessarily have the memory requirements and knowledge about what to do with the state and event data. State and event data 438 may reside only with network controllers 15A-N, such that the lighting control device does not whether the luminaire 25 is turned on, luminaire 25 is turned off, occupancy detected by sensor 28, photocell (sunlight) levels detected by sensor 28, etc., this saves hardware and development costs of the lighting control system. Hence, lighting control device 30 may merely receive (instead of determine) the indicator state to guide a user to select a next selectable lighting state available for the luminaire 25 by a visual cue. The lighting control device 30 then drives a user interface element, such as pilot light 415A and backlight 415B via a driver circuit 410 by making an illumination adjustment to the user interface elements that corresponds to the determined indicator states.

In FIG. 4B, the lighting control device 30 is a touch screen device where lighting control schedule adjustments are inputted via a user interface application 439 through manipulation or gestures on a touch screen 415C.

For output purposes, the touch screen 415C includes a display screen, such as a liquid crystal display (LCD) or light emitting diode (LED) screen or the like. For input purposes, touch screen 415C includes a plurality of touch sensors.

A keypad may be implemented in hardware as a physical keyboard of touch screen device 30, and keys may correspond to hardware keys of such a keyboard. Alternatively, some or all of the keys (and keyboard) of lighting control device 30 may be implemented as "soft keys" of a virtual keyboard graphically represented in an appropriate arrangement via touch screen 415C. The soft keys presented on the touch screen 415C may allow the user of lighting control device 30 to invoke the same user interface functions as with the physical hardware keys.

Drive/sense circuitry 455 is coupled to touch sensors of touch screen 415C for detecting the occurrence and relative location/position of each touch with respect to a content display area of touch screen 415C. In this example, drive/sense circuitry 455 is configured to provide microprocessor 430 with touch-position information based on user input received via touch sensors. In some implementations, microprocessor 430 is configured to correlate the touch position information to specific content being displayed within the content display area on touch screen 415C. The touch-position information captured by the drive/sense circuitry 455 and provided to microprocessor 430 may include, but is not limited to, coordinates identifying the location of each detected touch with respect to the display area of touch screen 415C and a timestamp corresponding to each detected touch position. Accordingly, the microprocessor 430 determines input of a lighting control event and generates generate schedule event action messages.

In general, touch screen 415C and its touch sensors (and one or more keys, if included) are used to provide a textual and graphical user interface for the lighting control device 30. In an example, touch screen 415C provides viewable content to the user at lighting control device 30. Touch screen 415C also enables the user to interact directly with the viewable content provided in the content display area, typically by touching the surface of the screen with a finger or an implement such as a stylus. The touch screen 415C has a graphical user interface (GUI) to change lighting state of the at least one luminaire 25 in response to input from a user and including a first GUI element to display lighting state of the at least luminaire and a second GUI element to guide a user to select the next lighting state and transition away from the current lighting state by the visual cue.

In FIG. 4B, the drive/sense circuitry 455 also responds to detectors 460 (e.g., occupancy, daylight, and audio sensors) that are on-board the lighting control device 30 to generate lighting control event messages. In response to the inputted or received lighting state adjustments, the lighting control application 441 generates and transmits lighting control event messages to network controller 15 and luminaire 25. For example, the user interface application 439 receives user input to change the at least one luminaire to the current lighting state via the GUI. In response to receiving the user input to change the at least one luminaire to the current lighting state via the GUI, the lighting control application 441 transmits a lighting control event message to the at least one luminaire 25 over the lighting device network to adjust the light intensity of the at least one luminaire to the current lighting state. In response to receiving the user input to change the at least one luminaire to the current lighting state via the GUI, the intelligent backlight application 436 generates and transmits a lighting state change event message that includes the current lighting state to the network controller 15 over the local network.

The lighting state change event message includes the current lighting state (e.g., a light-related adjustment, such as lighting intensity or brightness adjustment), and optionally an event date and an event time to make the lighting intensity or brightness adjustment (e.g., lumen output or photometric distribution). The light-related adjustment can also be a color adjustment (e.g., color point), a color temperature adjustment (e.g., correlated color temperature). The lighting state change event message may also designate a zone that specifies where to make the light-related adjustment. A zone is a group or collection of luminaires 25A-N that share space within an installation (e.g. a room or area) and may be defined by a zone identifier.

In response to transmitting the lighting state change event message to the network controller, intelligent backlight application 436 receives an indicator state that is the illumination adjustment to guide the user to select the next lighting state by the visual cue and transition away from the current lighting state. The intelligent backlight application 436 drives the touch screen 415C by updating the first GUI element to display the current lighting state and the second GUI element based on the received indicator state.

Messages can be sent to a network controller 15 and luminaire 25 that the lighting control device 30 is paired with over device network, for example, as a unicast message via network interface(s) 445. The lighting control device 30 embeds a source identifier in the message, such as the stored lighting control device identifier in identifier database 440 and a destination identifier, such as the stored network controller identifier in identifier database 440. Upon receipt of a message from the lighting control device 30, the network controller 15 and luminaire 25 checks both parameters (the source identifier and the destination identifier) and acts if the destination identifier belongs to the receiving network controller or luminaire and the source identifier belongs to a lighting control device on its respective network.

Figure 5A:
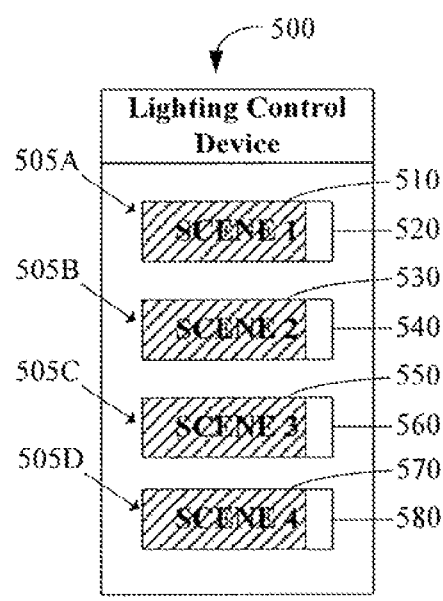
Figure 5B:
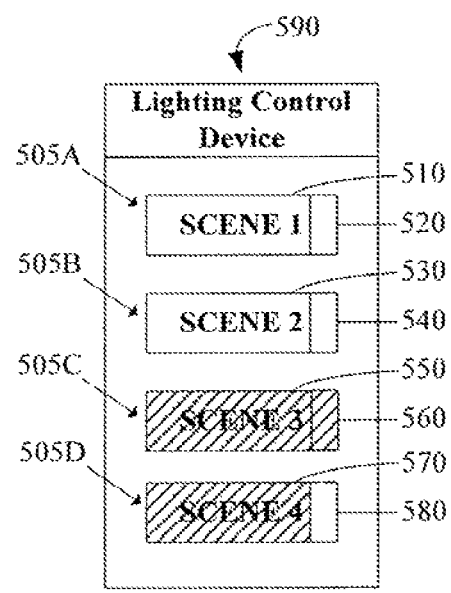

FIGS. 5A-B illustrate a lighting control device 30, specifically a networked wall switch 500. The wall switch 500 has a simple user interface, such as switches 505A-D (e.g., actuated via mechanical push buttons) and at least one indicator light per button 505A-D. The indicator light can be a backlight 510, 530, 550, 570 that illuminates the respective button and respective text of the button (e.g., SCENE 1) from behind and a pilot light 520, 540, 560, 580 mounted next to the button. The backlight 510, 530, 550, 570 and pilot light 520, 540, 560, 580 can be LED lights.

Each wall switch 500 has hardware/software elements such as a micro-processor, user-interface, storage, and networking components. A wall switch may also have variable control over the LED indicator lights whether they are backlights 510, 530, 550, 570 providing illumination for a label of a respective button 505A-D or pilot lights 520, 540, 560, 580 next to a button 505A-D to indicate the button status. Colored LED indicator lights may also be used in the backlight 510, 530, 550, 570 or pilot light configurations 520, 540, 560, 580. In the illustrations provided for networked wall switches 500, the user sees a visual distinction in the user interface with diagonal line areas representing indicator lights that are on and the plain areas representing an indicator light that is not on.

According to the combination of lit and unlit indicator lights, this draws the attention of a user to the respective areas of the wall switch 500 user interface. The configuration or actuation of the indicator states is determined by the intelligent backlighting process. In FIG. 5A, all backlight LEDs are on and no pilot lights are on indicating that no lighting scene is currently active (i.e., all luminaires are off). In FIG. 5B some backlight LEDs are on and one pilot light is on indicating that lighting scene 3 is currently active (some or all luminaires are on).

Figure 6:
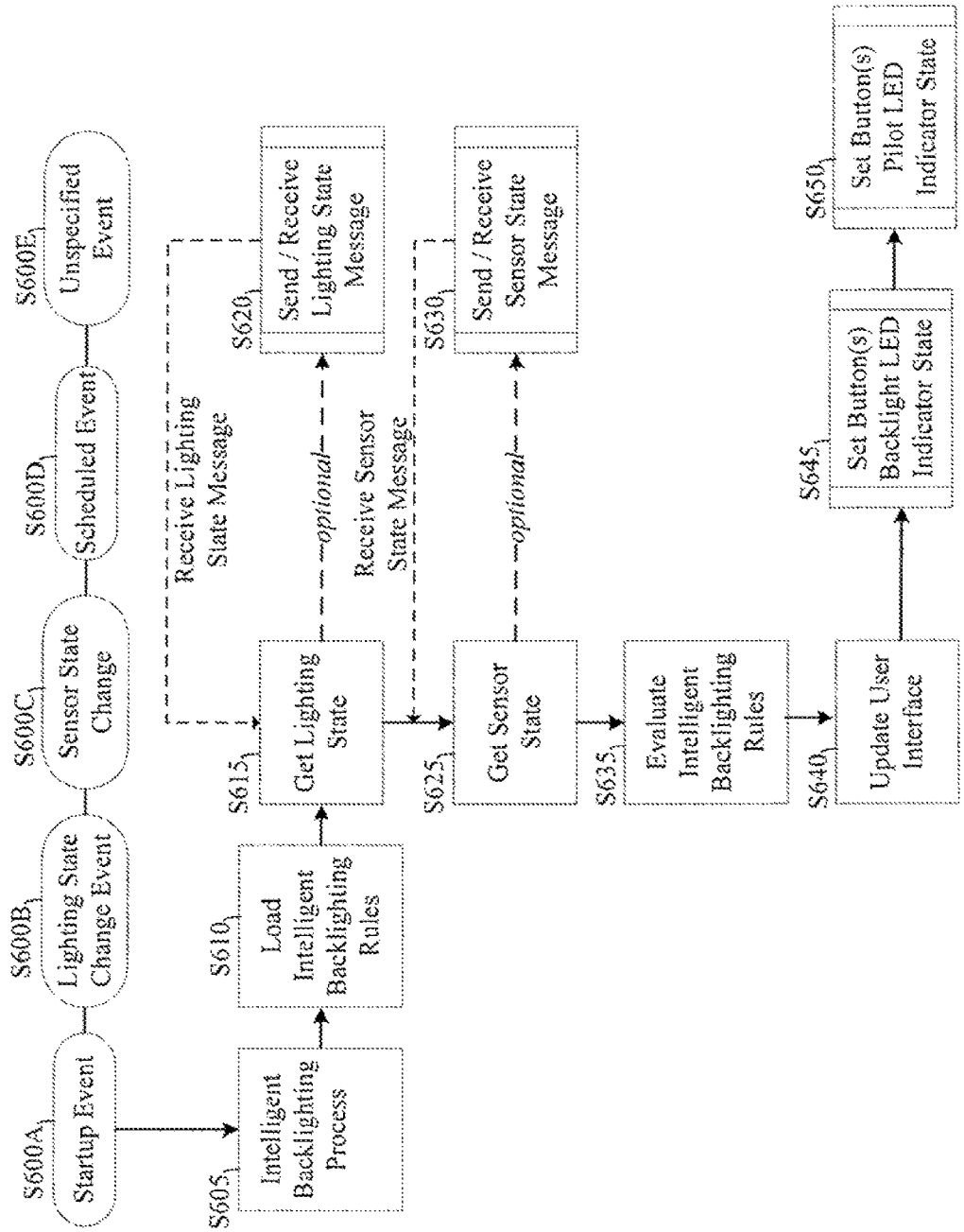
FIG. 6 is a flow chart of an intelligent backlighting protocol procedure executed by the lighting control system of FIG. 1, including network controller, lighting control device, sensor, and luminaire.

FIG. 6 is a flow chart of an intelligent backlighting protocol procedure executed by the lighting control system of FIG. 1, including network controller 15, luminaire 25, sensor 28, and lighting control device 30. Generally described, the intelligent backlighting procedure is for evaluating the existing lighting state/status for a room, other sensory status, and updating the state of an indicator light that represents the next recommended lighting state, on a lighting control device, such as a wall switch or other similar user interface. Before the intelligent backlighting procedure begins, a network controller 15 may connect to a lighting control device 30 over a network in order to control at least one luminaire 25 directly or indirectly via the lighting control device 30.

Beginning in steps S600A-E, the process is started by any number of changes within the system or events: a startup event (e.g., of a lighting control device), lighting state change event, sensor state change event, scheduled event, or other unspecified event. The events may occur internally to the device (e.g., network controller 15, lighting control device 30, or luminaire 25) implementing the intelligent backlighting process such as by hardware interrupt, application process, or in addition may be received by a network message. For example, execution of a scheduled event that changes a light intensity of at least one luminaire to a current lighting state when the event date and the event time occur triggers the intelligent backlighting procedure.

Moving to step S605, the intelligent backlighting procedure may execute on a controlling device on the network where it is both convenient and possible to have the processing performance, lighting state, sensor state, and intelligent backlighting rules data available on demand rather than having to query for the information across the network. Otherwise, the intelligent backlighting procedure may execute on a lighting control device 30, such as wall switch or like user interface device, but the lighting state, sensor state, and intelligent backlighting rules may need to be queried from other devices, such as from network controllers 15A-N, luminaires 25A-N, sensors 28A-N, and other lighting control devices 30A-N as the information is accessed by the network(s) 40, 50A-N, and 60A-N.

Continuing now to step S610, once the intelligent backlighting procedure is started through any of the specified events, the intelligent backlighting rules may be loaded or re-loaded from a persistent storage or memory according to a particular dataset specified by the event. On a startup event for instance the "default" intelligent backlighting rules can be loaded and will be subsequently used unless another event indicates a different set of rules should be loaded. This method allows a fixed set of rules to be evaluated regardless of events or a dynamic set of rules based on changes in the system. The intelligent backlighting rules may optionally be constant in storage or memory and not allowed to be changed.

The core of the intelligent backlighting process is performed by gathering the lighting state and sensor state data and then evaluating the data according to the intelligent backlighting rules. In step S615, a current lighting state is retrieved, for example, by storage within internal memory of the device running the process, such as lighting control device 30. Alternatively, a network controller 15 may receive a lighting state change event message with the current lighting state of at least luminaire over the network from the lighting control device 30 and store the current lighting state in memory. The current lighting state of at least one luminaire is then retrieved from the memory and used in the intelligent backlighting process, for example, in response to executing a scheduled event or a startup event, such as starting up a lighting control device 30.

The lighting state can optionally be retrieved by network messages as well, for example, in step S620 the lighting control device 30 may receive a lighting state message from a network controller 15 or luminaire 25 in response to sending a lighting state message querying for the current lighting state. In an example, the current lighting state is determined by receiving a respective lighting state message including a respective light intensity from a plurality of luminaires that includes at least one luminaire, aggregating the light intensity of the plurality of luminaires from the respective lighting state message, and storing the aggregated light intensity as the current lighting state in a memory. The aggregated lighting state is then retrieved from the memory and used in the intelligent backlighting process. As noted above, the current lighting state can be determined by the lighting control device 30 or network controller 15 depending on resource availability.

In step S625, the sensor state is retrieved, for example, by storage within internal memory of the device running the process, such as the lighting control device 30. The current sensor state can optionally be retrieved by network messages as well, for example, in step S630 the lighting control device 30 may receive a sensor state message from a network controller 15 or sensor 28 in response to sending a sensor state message querying for the sensor state. The sensor state of at least one sensor is retrieved, for example, in response to executing a scheduled event or a startup event, such as starting up a lighting control device 30. In an example, the lighting control device 30 (or network controller 30) receives a sensor state message from the at least one sensor, including an ambient light level measured in a room that the at least one sensor is located in, and stores the ambient light level in memory as the sensor state. The ambient light level is then retrieved from the memory and used in the intelligent backlighting process. In another example, the retrieved sensor state is detection of an object within a predetermined distance from a proximity sensor. Alternatively, the retrieved sensor state is detection of a level or percentage between maximum and minimum distance which can vary the pilot light or backlight button illumination adjustment (e.g., light intensity) according to the distance to the sensor, for example. The sensor state can be infrared occupancy detection, noise level detection, camera sensory data, etc., or other detected sensor measurements that can be used alone or in conjunction with other sensors to determine an overall sensor state.

Proceeding to step S635, once the lighting state and sensor state are fetched and ready for evaluation, the lighting state and sensor state are compared against the intelligent backlighting rules. The intelligent backlighting rules can be represented in a variety of formats such as lists, hierarchal table, relational database table, or other data format. The evaluation process of the backlighting rules compares the contents of the intelligent backlighting rules against the lighting and sensor state.

Moving to step S640, the resultant output of the backlighting rules evaluation is an indicator state that applies an update to the user interface of a device implementing the intelligent backlighting process (e.g., lighting control device). Alternatively, a series of messages are sent from a network controller 15 to the lighting control device 30, such as a wall switch device, and other like device user interfaces to transmit the determined indicator state corresponding to an illumination adjustment to guide the user to select the next lighting state by a visual cue.

In steps S645 and S650, the user interface elements are updated according to the indicator state determined by the intelligent backlighting rules. In step S645, the user interface element that is updated is an LED light used for button backlighting or label highlighting on the button. In step S650, the user interface element that is updated is a specific button pilot light. Other types of user interface elements may be updated, such as a display screen of a touch screen type lighting control device 30 or network controller 15. For example, the user interface element can a graphical user interface element displayed on a screen of the lighting control device 30 and the indicator state may provide an illumination adjustment to a graphical representation of a light emitting diode (LED), icon, or color graphic.

FIG. 7A is a table 700 of lighting states 705 of a single luminaire or any number of luminaires that are evaluated for determining the final intelligent backlighting state of a lighting control device 30 implementing the intelligent backlighting procedure. The lighting state table 700 of lighting states is not exhaustive, only an illustration of possible states which may be evaluated for determining the final intelligent backlighting state of a lighting control device 30, such as wall switch or like user interface implementing the intelligent backlighting process. As shown, various lighting states 705 are available that corresponds to varying light intensities as shown in the lighting state description 710 column. In the example, five lighting states are available for luminaires and the five lighting states correspond to all luminaires being off, 1% light intensity, below 30% light intensity, above 70% light intensity, and 100% light intensity.

FIG. 7B is a table 720 of sensor states that are evaluated for determining the final intelligent backlighting state of a lighting control device 30 implementing the intelligent backlighting procedure. The sensor state table 720 of sensor states is not complete or exhaustive, only an illustration of possible states which may be evaluated for determining the final intelligent backlighting state of a lighting control device 30, such as wall switch or like user interface implementing the intelligent backlighting process. Various sensor states 725 are available for proximity and light type sensors. As shown in the sensor state description 730 column, the sensor state for the proximity sensor can represent a proximity sensor and its detection of an object (usually a person) within some distance from the sensor. As shown in the sensor state description 730 column, the sensor state for the light sensor can represent ambient light level (lux) measured in a room that the proximity sensor is directed at. There are no fixed number or types of sensors that can be used in the intelligent backlighting process. In the example, three sensor states are available for the proximity sensor and the three sensor states correspond to the object being detected within 3 feet, 10 feet, and within 10 feet and the light sensor reporting 30 lux.

FIG. 7C is a table 740 of indicator states to represent the state of a button and associated control point of a luminaire 25 for determining the final intelligent backlighting state of a lighting control device 30 implementing the intelligent backlighting procedure. An indicator state is the state of illumination, such as for an LED light, whether used for backlighting a button and its label or a pilot light mounted next to the button and therefore associated with the button. An indicator state may also be a graphical representation of an LED, icon, or color graphic. The indicator states in indicator state table 740 are not exhaustive, but are provided for demonstration purposes. The indicator state, for example, is used to represent the state of a button and its associated control point such as a light fixture. Normally, if the control point state changes, the indicator state of a button also changes to reflect current state.

FIG. 7D is a table 760 of rules used in a default configuration of intelligent backlight lighting rules that describe the typical user interaction with a networked wall switch that does not guide the user to the next logical lighting state. The table 760 of default rules are evaluated after an event. In the illustrated table 760, the backlight indicator state 780 of each button 775 is set to dimly lit and all pilot light indicator states 785 are set to off when the lighting state 765 is off (i.e., there is no sensor state definition in rules). The natural use of the lighting control device 30 by the user is to press one of the buttons (any of them) during the "light level is off" state and expect something in the user's room or environment to change, such as the lighting state 765. Continuing the example, upon pressing one of the buttons 775 the lighting state 765 changes to "light level is on" which triggers the intelligent backlighting process and therefore evaluates to the respective button pilot light indicator state 785 to change to reflect the current lighting state. Of note, this style user interface does not guide the user or provide visual hints as to what button should be pressed next.

FIG. 8A illustrates the display on a networked wall switch 800 in the "off" lighting state using the default configuration of the intelligent backlight rules of FIG. 7D. As shown, the wall switch 800 includes four buttons 805A-D. Each button 805A-D corresponds to a different set scene (scenes 1-4). The backlights 810, 830, 850, 870 provide illumination for a label of a respective button 805A-D and pilot lights 820, 840, 860, 880 next to the four set scene buttons indicate the button status, for example, whether the button is the active current lighting state. In FIG. 8A, the "light level is off" state (i.e., all luminaires are off) of FIG. 7D is illustrated. Hence, all backlight LEDs 810, 830, 850, 870 are all dimly lit in accordance with a respective backlight indicator state and pilot lights 820, 840, 860, 880 are all off in accordance with a respective pilot light indicator state. Networked wall switch 800 thus shows that no lighting scene is currently active (i.e., all luminaires are off).

FIG. 8B illustrates the "on" lighting state on a networked wall switch 890 using the default configuration of the intelligent backlight rules of FIG. 7D. In the "light level is on" state, all backlight LEDs 810, 830, 850, 870 are all dimly lit in accordance with a respective backlight indicator state and pilot lights 840, 860, 880 are all off in accordance with a respective pilot light indicator state. One pilot light 820 is on indicating that lighting scene 1 is currently active (some or all luminaires are on). Networked wall switch 890 thus shows that lighting scene 1 is currently active (i.e., some or all luminaires are on).

FIG. 9 is a table 900 of intelligent backlight rules for a presentation configuration in the intelligent backlighting procedure that are evaluated once triggered by an event and after the lighting and sensor states are retrieved. The table 900 details a more complicated example of the intelligent backlighting process rules involving lighting state 910, sensor state 920, buttons 930, backlight indicator state 950, and pilot light indicator state 950. In the first rule 960 for the "light level is off" lighting state, only the top two user interface elements (buttons) are dimly lit, the others are off when the lighting state is in the "light level is off" state. In a dark room, this has the effect of two buttons being clearly more visible than the others, this is meant to get the attention of the user as one of the two buttons being viable selections.

Upon press of one of the top two buttons (buttons 1 and 2) the lighting state changes to a scene appropriate for a presentation (i.e., luminaires dimly on) as shown in the second rule 970 for the "light level is dim" lighting state. The lighting state changed which triggers the intelligent backlight process for this "presentation" configuration. The pilot light for the top bottom (button 1) previously pressed to activate this lighting state now has a dimly lit LED backlight, such as to not be bright or distracting during a meeting for instance. A new button (button 3) also now has a backlight dimly lit to indicate this is a new button selection available.

In the third rule 980 for the "light level is dim" lighting state and the "sensor detects far and dim" state, if the user were to approach the intelligent backlighting capable device, the sensor state would change which again triggers the process. In addition to the previous backlighting and pilot light state of the button interface, the bottom button backlight (button 4) becomes brightly lit and the pilot light indicator flashes slowly. This change in user interface behavior according to user interaction as they approach the lighting control device 30 gives a very clear visual cue or guidance as to the most likely button to press (button 4—the brightly lit one with pilot light flashing).

Figure 10A:
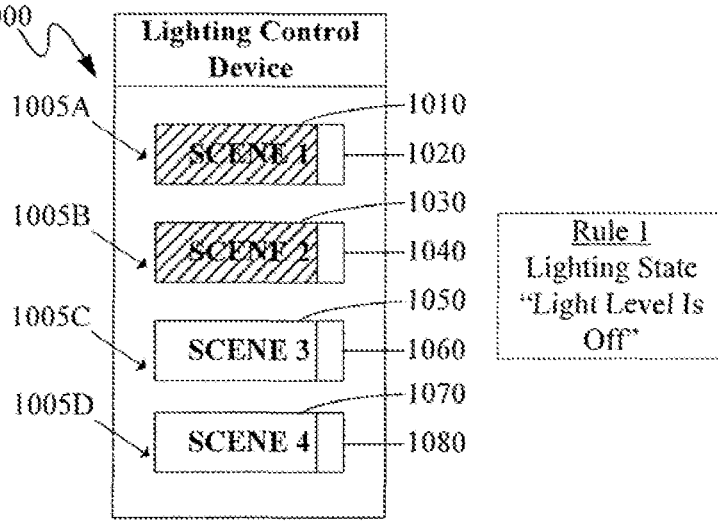
FIG. 10A illustrates the display on a networked wall switch in the "off" lighting state using the presentation configuration of the intelligent backlight rules of FIG. 9.

FIG. 10A illustrates the display on a networked wall switch 1000 in the "off" lighting state using the presentation configuration of the intelligent backlight rules of FIG. 9. As shown, the wall switch 1000 includes four buttons 1005A-D. Each button 1005A-D corresponds to a different set scene (scenes 1-4). The backlights 1010, 1030, 1050, 1070 provide illumination for a label of a respective button 1005A-D and pilot lights 1020, 1040, 1060, 1080 next to the four set scene buttons indicate the button status, for example, whether the button is the active current lighting state or the recommended next lighting state. In FIG. 10A, the first rule 960 for the "light level is off" lighting state is illustrated. Hence, backlight LEDs 1010, 1030 are dimly lit; backlight LEDs 1050, 1070 are off; and pilot lights 1020, 1040, 1060, 1080 are off, in accordance the first rule 960 of FIG. 9. Networked wall switch 1000 thus shows that lighting scenes 1 and 2 are the recommend next lighting states.

Figure 10B:
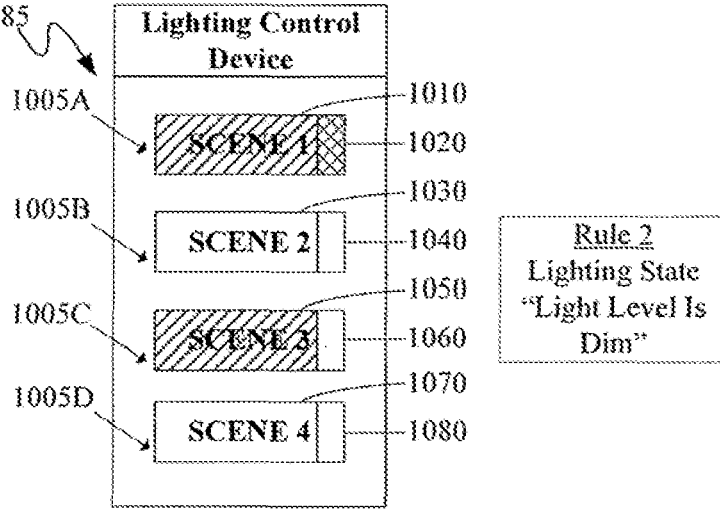
FIG. 10B illustrates the display on a networked wall switch in the "dim" lighting state using the presentation configuration of the intelligent backlight rules of FIG. 9.

FIG. 10B illustrates the display on a networked wall switch 1085 in the "dim" lighting state using the presentation configuration of the intelligent backlight rules of FIG. 9. In FIG. 10B, the second rule 970 for the "light level is dim" lighting state is illustrated. Hence, backlight LEDs 1010, 1050 are dimly lit; backlight LEDs 1030, 1070 are off;

pilot light 1020 is on; and pilot lights 1040, 1060, and 1080 are off in accordance the second rule 970 of FIG. 9.

Figure 10C:
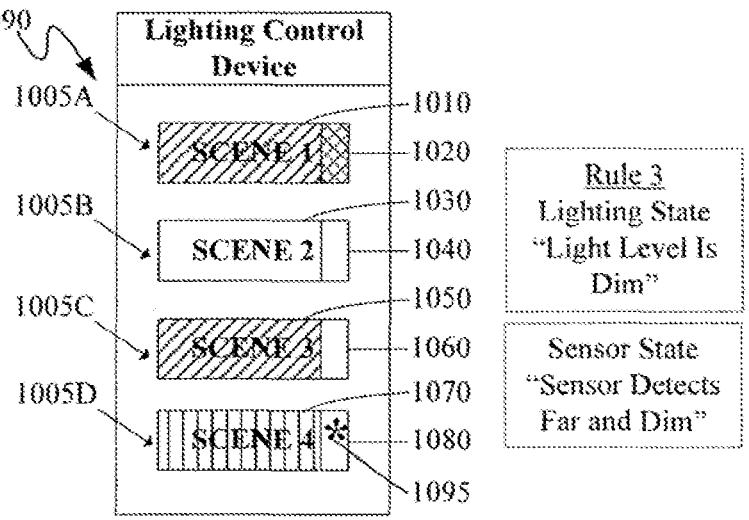
FIG. 10C illustrates the display on a networked wall switch in the "dim" lighting state and "sensor detects far and dim" sensor state using the presentation configuration of the intelligent backlight rules of FIG. 9.

FIG. 10C illustrates the display on a networked wall switch 1000 in the "dim" lighting state and "sensor detects far and dim" sensor state using the presentation configuration of the intelligent backlight rules of FIG. 9. In FIG. 10C, the third rule 980 for the "light level is dim" lighting state and "sensor detects far and dim" sensor state is illustrated. Hence, backlight LEDs 1010, 1050 are dimly lit; backlight LED 1030 is off; pilot light 1020 is dimly lit; and pilot lights 1040, 1060 are off in accordance the third rule 1080 of FIG. 9. However, note that backlight LED 1070 is brightly lit and pilot light 1080 is flashing in accordance the third rule 980 of FIG. 9. Networked wall switch 1000 thus shows that lighting scene 1 is the current lighting state and lighting scene 4 is the recommend next lighting state and provides a visual cue to the user to guide the user to select lighting scene 4 as the next lighting state. The user-interaction guidance or visual cue enhances the user experience with a lighting control system product by providing an indication to the next reasonable use of a lighting control system.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A method comprising:
   in response to an event, retrieving a current lighting state of at least one luminaire or a sensor state of at least one sensor; and
   determining an illumination adjustment for a user interface element of a lighting control device configured to control the at least one luminaire based on the current lighting state, the sensor state, the event, or a combination thereof, the illumination adjustment producing a visible output to guide a user to select a next lighting state for the at least one luminaire via the user interface;
   wherein:
   the event is:
   (i) a local event for a local network,
   (ii) a global event for a link network, or
   (iii) an internal event to the at least one luminaire, the lighting control device, or a network controller; and
   the event includes a startup event, a lighting state change event, a sensor state change event, or a scheduled event.

2. The method of claim 1, wherein the user interface element is a button and a pilot light on a wall switch and determining the illumination adjustment further comprises:
   determining (i) a backlight indicator state representing a backlight of the button having a control point to change the at least one luminaire to the next lighting state and corresponding to a first illumination adjustment, and (ii) a pilot light indicator state representing state of the pilot light that is next to the button and corresponding to a second illumination adjustment.

3. The method of claim 2, further comprising:
   driving the backlight and the pilot light of the lighting control device based on the determined backlight indicator state and the determined pilot light indicator state.

4. The method of claim 3, wherein the first illumination adjustment of the backlight and the second illumination adjustment of the pilot light transitions the backlight and the pilot light to a different light intensity or color compared to the current lighting state or to a flash setting.

5. The method of claim 1, further comprising:
   comparing the sensor state to a set of intelligent backlighting rules; and
   wherein the determined illumination adjustment is based on the comparison of the current lighting state and the sensor state to the set of intelligent backlighting rules.

6. The method of claim 5, further comprising:
   before retrieving the current lighting state of the at least one luminaire and the sensor state of the at least one sensor, connecting from the network controller to the lighting control device over a network, wherein the network controller controls the at least one luminaire directly or indirectly via the lighting control device; and
   transmitting the determined illumination adjustment from the network controller to the lighting control device.

7. The method of claim 6, wherein retrieving the current lighting state of the at least one luminaire comprises:
   receiving the current lighting state of the at least luminaire over the network from the lighting control device.

8. The method of claim 5, wherein retrieving the sensor state of the at least one sensor comprises:
   receiving from the at least one sensor an ambient light level measured in a room that the at least one sensor is located in; and
   storing the ambient light level in memory as the sensor state.

9. The method of claim 5, further comprising:
   executing the startup event by starting up the lighting control device; and
   wherein retrieving the current lighting state of the at least one luminaire and the sensor state of the at least one sensor is in response to starting up of the light control device.

10. The method of claim 5, further comprising:
executing the scheduled event that changes the at least one luminaire to the current lighting state; and
wherein retrieving the current lighting state of the at least one luminaire and the sensor state of the at least one sensor is in response to executing the scheduled event.

11. The method of claim 1, further comprising:
comparing the sensor state to a set of intelligent backlighting rules; and
wherein:
the at least one sensor is a proximity sensor and the sensor state is detection of an object within a predetermined distance from the proximity sensor; and
the determined illumination adjustment is based on the comparison of the current lighting state and the sensor state to the set of intelligent backlighting rules.

12. The method of claim 1, wherein retrieving the current lighting state of the least one luminaire comprises:
receiving a respective light intensity from a plurality of luminaires that includes the at least one luminaire;
aggregating the light intensity of the plurality of luminaires; and
storing the aggregated light intensity as the current lighting state in a memory.

13. The method of claim 1, wherein the user interface element is a button of a wall switch.

14. The method of claim 1, wherein the user interface element is a graphical user interface displayed on a screen of the lighting control device.

15. A lighting control device comprising:
a network communication interface system configured for data communication for:
communication with a network controller to receive an illumination adjustment for the lighting control device to guide a user to select a next lighting state; and
communication with at least one luminaire;
a processor coupled to the network communication interface system;
a touch screen, configured to provide a graphical user interface (GUI) to change lighting state of the at least one luminaire;
a memory accessible to the processor; and
programming in the memory which configures the processor to:
receive a user input to change the at least one luminaire to a current lighting state via the GUI;
transmit the current lighting state to the at least one luminaire to adjust the at least one luminaire to the current lighting state;
receive the illumination adjustment from the network controller; and
drive the touch screen by updating the GUI based on the received illumination adjustment.

16. A network controller comprising:
a network communication interface system configured for data communication over a network with at least one luminaire to adjust the at least one luminaire;
a processor coupled to the network communication interface system;
a memory accessible to the processor and storing a current lighting state of the at least one luminaire; and
programming in the memory which configures the processor to determine an illumination adjustment for a user interface element to guide a user to select a next lighting state for the at least one luminaire, wherein the user interface element includes a button and a pilot light on a wall switch, and determining the illumination adjustment further comprises:
determining (i) a backlight indicator state representing a backlight of the button having a control point to change the at least one luminaire to the next lighting state and corresponding to a first illumination adjustment, and (ii) a pilot light indicator state representing state of the pilot light that is next to the button and corresponding to a second illumination adjustment.

17. The network controller of claim 16, wherein the first illumination adjustment of the backlight and the second illumination adjustment of the pilot light transitions the backlight and the pilot light to a different light intensity or color compared to the current lighting state or to a flash setting.

18. A network controller comprising:
a network communication interface system configured for data communication over a network with at least one luminaire to adjust the at least one luminaire;
a processor coupled to the network communication interface system;
a memory accessible to the processor and storing a current lighting state of the at least one luminaire; and
programming in the memory which configures the processor to:
determine the current lighting state stored in the memory by:
receiving a respective light intensity from a plurality of luminaires that includes the at least one luminaire;
aggregating the light intensity of the plurality of luminaires; and
storing the aggregated light intensity as the current lighting state in the memory; and
determine an illumination adjustment for a user interface element to guide a user to select a next lighting state for the at least one luminaire.

19. The network controller of claim 18, wherein execution of the programming in the memory configures the processor to determine the illumination adjustment based on a sensor state.

* * * * *